United States Patent
Stollery et al.

(10) Patent No.: US 11,426,902 B2
(45) Date of Patent: Aug. 30, 2022

(54) STRIPPING OF A DIP-MOULDED GLOVE FROM A FORMER

(71) Applicant: SAFEDON LIMITED, Woodbridge (GB)

(72) Inventors: Jonathan William Stollery, Woodbridge (GB); Kim Marie Stollery, Woodbridge (GB)

(73) Assignee: SAFEDON LIMITED, Woodbridge (GB)

( * ) Notice: Subject to any disclaimer, the term of this patent is extended or adjusted under 35 U.S.C. 154(b) by 685 days.

(21) Appl. No.: 16/328,415

(22) PCT Filed: Aug. 25, 2017

(86) PCT No.: PCT/GB2017/052507
§ 371 (c)(1),
(2) Date: Feb. 26, 2019

(87) PCT Pub. No.: WO2018/037243
PCT Pub. Date: Mar. 1, 2018

(65) Prior Publication Data
US 2019/0193306 A1 Jun. 27, 2019

(30) Foreign Application Priority Data
Aug. 26, 2016 (GB) .................... 1614568

(51) Int. Cl.
*B29C 33/44* (2006.01)
*B29C 37/00* (2006.01)
(Continued)

(52) U.S. Cl.
CPC ........ *B29C 33/444* (2013.01); *B29C 37/0017* (2013.01); *B29C 41/42* (2013.01); *B29D 99/0067* (2013.01); *B29L 2031/4864* (2013.01)

(58) Field of Classification Search
CPC ... B29C 33/444; B29C 37/0017; B29C 41/42; B29D 99/0067; B29L 2031/4864
See application file for complete search history.

(56) References Cited

U.S. PATENT DOCUMENTS 3,369,271 A  2/1968 Rodrigues et al.
3,655,317 A  4/1972 Funkhouser et al.
(Continued)

FOREIGN PATENT DOCUMENTS

CN  201105930 Y  8/2008
CN  202439169 U  9/2012
(Continued)

OTHER PUBLICATIONS

Japanese Office Action (Application No. 2017-546237) dated Feb. 20, 2020 (with English translation).
(Continued)

*Primary Examiner* — Joseph S Del Sole
*Assistant Examiner* — Baileigh Kate Darnell
(74) *Attorney, Agent, or Firm* — Burr & Brown, PLLC

(57) ABSTRACT

Glove stripping apparatuses for fully stripping a partially stripped elastomeric dip-moulded glove from a dip-moulding former comprises a gripper having first and second gripping members movable relative to each other, an abutment, an open space, and an actuation system. Also, production lines for producing elastomeric dip-moulded gloves, methods for fully stripping gloves from dip-moulding formers, and production line processes.

24 Claims, 21 Drawing Sheets

(51) Int. Cl.
B29C 41/42 (2006.01)
B29D 99/00 (2010.01)
B29L 31/48 (2006.01)

(56) References Cited

U.S. PATENT DOCUMENTS

| | | | |
|---|---|---|---|
| 5,776,520 | A | 7/1998 | Howe et al. |
| 5,909,800 | A | 6/1999 | Huang |
| 10,092,047 | B2 * | 10/2018 | Wong ................. A41D 19/0055 |

FOREIGN PATENT DOCUMENTS

| | | |
|---|---|---|
| CN | 203888113 U | 10/2014 |
| DE | 2 108 486 A1 | 9/1971 |
| GB | 851853 | 10/1960 |
| GB | 1 334 168 A | 10/1973 |
| GB | 1 487 73 8 A | 10/1977 |
| JP | S52-59 B1 | 1/1977 |
| JP | S56-067243 | 6/1981 |
| WO | 2010/020782 A2 | 2/2010 |
| WO | 2011/048414 A1 | 4/2011 |
| WO | 2014/122595 A1 | 8/2014 |
| WO | 2016/139640 A1 | 9/2016 |

OTHER PUBLICATIONS

Chinese Search Report (Application No. 201780052514.3) dated Jun. 22, 2020.
Chinese Office Action (Application No. 201780052514.3) dated Jun. 30, 2020 (with English translation).
International Search Report and Written Opinion of the International Searching Authority from a corresponding international patent application (PCT/GB2017/052507) dated Dec. 4, 2017, 10 pages.
GB Search Report from a corresponding GB patent application (GB 1614568.2) dated Feb. 15, 2017, 3 pages.

* cited by examiner

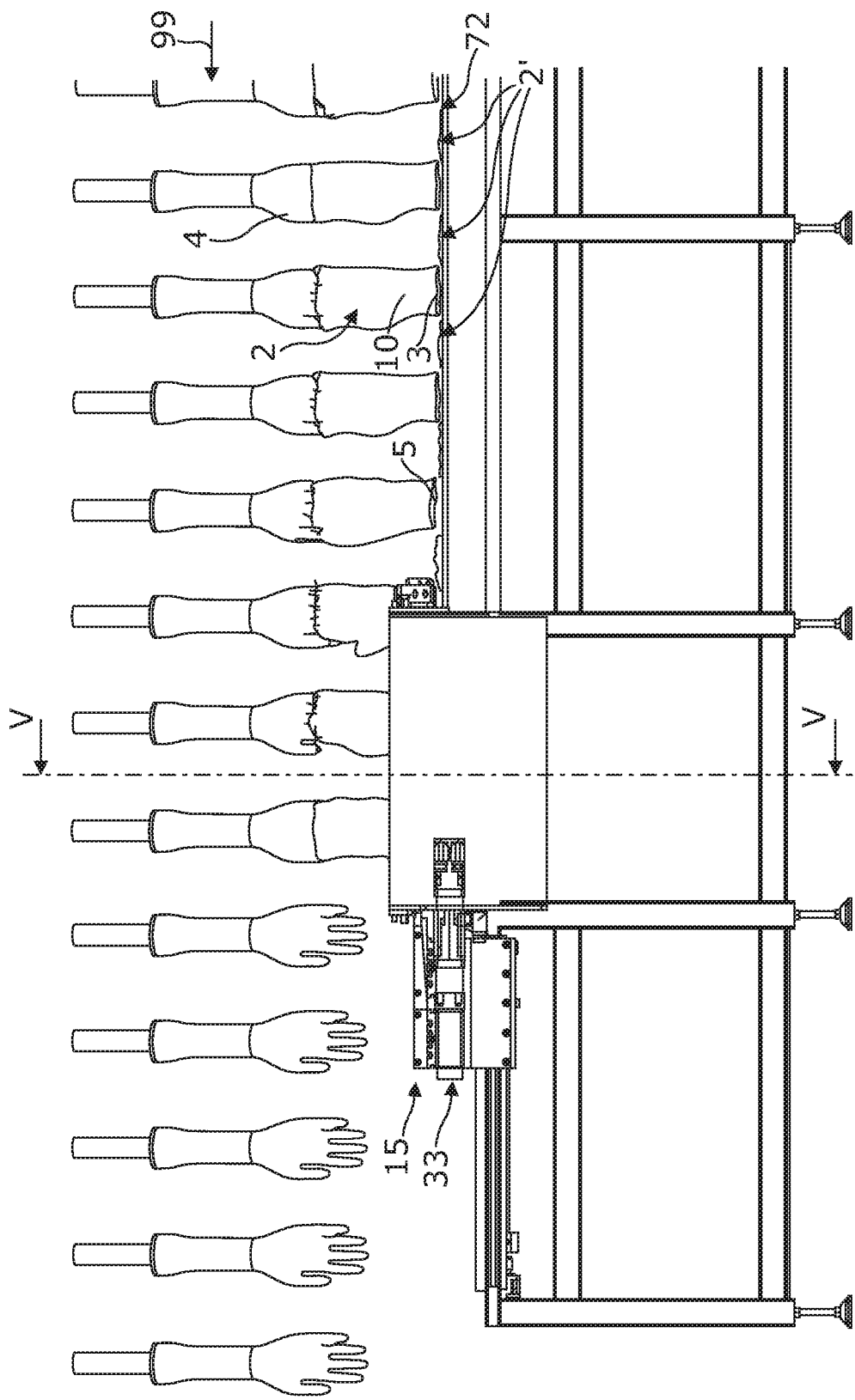

STRIPPING OF A DIP-MOULDED GLOVE FROM A FORMER

BACKGROUND a. Field of the Invention

The present invention relates to an apparatus and method for the stripping of elastomeric gloves from a dip-moulding former, when the gloves have already been partially stripped such that each glove has a downwardly hanging cuff end portion with a terminal beaded cuff end. The invention particularly relates to the stripping and subsequent handling of dip-moulded disposable inspection gloves such as those used in clinical, veterinary, dental or medical environments or in other situations where hygiene is important, such as food preparation.

b. Related Art

There is an increasing need to control infection of patients in hospitals, clinics, and doctors' surgeries from infectious bacteria resistant to multiple antibiotics, in particular methicillin-resistant *Staphylococcus aureus* (MRSA). Research has also shown that if someone has MRSA on their hands, the bacteria would be left on the next four surfaces touched by that person. Once MRSA is on an item it will remain there for up to 80 days unless that item is cleaned. *C. difficile* will remain active on surfaces much longer than that. One effective and inexpensive way to control such contamination is the use of disposable inspection gloves.

Examples of manual and automatic production systems for packing such gloves into a box or dispenser are disclosed in patent documents WO 2010/020782 A2 and WO 2011/048414 A1. Such systems work most effectively when gloves are presented to a packing station in a predictable or regular manner by a conveyor.

In such production systems, whether for gloves or other products that are similarly flexible and relatively flat, it can be very useful to transport products on a conveyor, for example a belt conveyor.

Dip-moulded gloves are produced on a mould or tool, referred to herein as a "former", having a particular shape. The former is dipped into a liquid bath and then raised out of the bath and heated, dried or cured in order to remove solvent from the liquid clinging to the former or to cross-link polymer chains, and so leave a solid film on the former. In this description, the resulting film is referred to as having been "cured".

Disposable inspection gloves are increasingly made from nitrile butadiene rubber, referred to herein simply as nitrile, owing to its relatively low cost, good flexibility and elasticity and non-allergenic properties. Such gloves are formed on a former that is hand-shaped with a cuff portion and with a digit portion at the end, the digit portion being oriented lowermost when dipped into and raised from a tank of liquid. A production plant will have a long continuous chain conveyor which transports the formers through the various production steps, which will include a stripping step in which the cured glove is stripped off the former inside out. Following this, the empty former is checked for any residues and cleaned, which can include dipping in an acid bath.

A glove manufacturing line will normally have two pairs of such chain conveyors, making four parallel lines, passing through the same tanks, and stripping and inspection stages. Production speeds are of the order of about one glove per second per line.

Stripping gloves off formers normally involves manual labour, at least in part of the stripping process. The process can be partly automated by using a glove stripping machine that pulls most of the glove off the former, such that a palm portion and a cuff end of the glove hangs downwards from the parts of the glove still in contact with the former, including the former digit tips. The gloves are provided with a reinforcing bead or rim at a cuff end. When partly stripped from the former, the glove cuff end hangs downwardly from the former digits.

At typical glove dip-moulding production speeds, there is normally the need for two, three or four workers per line. The free-hanging glove cuffs are normally pulled by workers to peel the glove digits completely off the former, after which each glove is dropped in a box or placed on a growing pile at the glove stripping station.

The cost of labour is an increasing component of the total cost of production. Therefore, machines are known for the final full stripping of gloves from a former. However, the issue is not just the labour required at the stripping station, but also the labour needed to handle gloves after these are removed from the stripping station for packing into boxes or dispensers.

Utility Model document CN 202439169 U discloses a machine for automatically stripping gloves from a dip-moulding former and placing the stripped gloves, one at a time, on a receiving surface to form a stack of gloves. Gloves are partially stripped from the former prior to reaching the machine which has a pair of opposed rollers. The rollers grip a cuff end of the glove which is then peeled off the former cuff-first so that the peeled glove is inside out relative to the formed glove. A limitation of machines such as this is that the stack of gloves which is formed beneath the pair of rollers is very uneven. Although workers can be employed to tidy and align each stack of gloves produced by the machine, the gloves still do not lie evenly flat within the stack, which makes further processing and packing that much more difficult to implement. The unevenness also significantly limits the maximum number of gloves that can be packaged in a glove dispenser.

Patent document WO 2014/122595 A1 discloses another way of stripping partially stripped elastomeric gloves from a dip-moulding former using a pair of opposed belt conveyors in a V-configuration which can be pivoted together to grip a cuff end portion. The belts are then activated to pull the cuff end and fully strip the glove from the former. Following this, the opposed belts can be moved into position for discharging the glove onto a conveyor belt by again activating the belt conveyors. Whilst this system is effective in providing a mechanised process for stripping gloves and then depositing gloves on a conveyor belt, the apparatus is relatively complex and heavy, which makes it more difficult to achieve a cycle time fast enough to match the speed of the glove production line. Furthermore, the position of the deposited cuff ends on the conveyor belt will vary in dependence on variations in how far the cuff end portion hangs downwardly from the former. This in turn places more demands on automatic glove packing equipment used to pick gloves from the conveyor belt and to pack gloves into dispensing containers.

It is an object of the present invention to provide a more convenient apparatus and method for stripping elastomeric gloves off a former in a dip-moulding process.

SUMMARY OF THE INVENTION

According to a first aspect of the invention there is provided a glove stripping apparatus for fully stripping from a series of dip moulding formers a corresponding series of partially stripped elastomeric dip-moulded gloves each having a downwardly hanging cuff end portion of said glove, each of said cuff end portions having opposite first and second sides and being terminated at a beaded cuff end, the apparatus comprising:

a gripper having a first gripping member and a second gripping member, the first gripping member being moveable relative to the second gripping member and/or the second gripping member being moveable relative to the first gripping member for gripping said opposite first and second sides of at least one of said cuff end portions each downwardly hanging from a corresponding dip moulding former in the series of dip moulding formers, said gripper being movable away from said dip moulding former during stripping of a glove from said former;

an abutment, said abutment being located proximate said first side of said downwardly hanging cuff end portion;

an open space beneath said abutment, said open space extending in a first direction away from said first side, the gripper being horizontally movable in said open space in said first direction during said stripping; and an actuation system, said system comprising at least one actuator for driving movement at least one of said first and second gripping members during gripping of said cuff end portion and for driving movement of said gripper during said stripping, and a controller for controlling said movements during gripping and stripping of said glove;

wherein the actuation system is configured to use the gripping members to grip said cuff end portion and then to move the gripper in said open space substantially horizontally in said first direction during said stripping thereby pulling said first side against said abutment so that a first stripped portion of said glove extends generally sideways between the gripping members and said abutment, and a second stripped portion of said glove extends generally upwards between the abutment and said former, until said glove is fully stripped by said substantially horizontal movement of said gripper.

The gripping members may be configured to grip the cuff end portions of just one glove at a time, but in a preferred embodiment of the invention, the gripping members are elongate in the direction of the line of formers on the production line and are configured to grip a plurality of cuff end portions from corresponding formers so that multiple gloves may be stripped in one operation of the grippers.

In general, the first gripping member and a second gripping member will have corresponding first and second gripping surfaces facing each other across a gap that extends along a second direction. The second direction may be parallel with a line of formers on the dip-moulded glove production line. In this case, the glove first and second sides will be laterally outward sides relative to the direction of motion of the formers on the production line.

The first direction may be substantially perpendicular to the second direction.

During stripping of the glove, the abutment thereby restricts further movement in the first direction of the second stripped portion of the partially glove extending between the abutment and the former. The substantially horizontal movement of the gripping members will result in the gripping members moving away from the former. As the glove is of elastomeric material, the first and second stripped portions of the glove will be stretched between the gripping members and the abutment and between the abutment and the former.

The substantially horizontal movement may have some downward component as long as the movement causes the first side to come up against the abutment.

The abutment may present a bearing surface to the first side of the hanging cuff end portion, this bearing surface being adapted not to bind with movement of the first and second stripped portions during stripping of the glove.

The bearing surface may be any of: a smooth non-rotating surface; a roller bearing surface; or an air bearing surface.

Preferably, the bearing surface is convex between the first and second stripped portions. The abutment is preferably fixed, i.e. the abutment does not move during stripping of the glove.

The abutment is preferably elongate and substantially parallel with the first side of the cuff end portion. As the first and second sides of the former will most usually be oriented parallel with a line of movement of a series of formers on a production line, at least when it is time to strip the partially stripped gloves, the abutment will normally be substantially parallel with the line of movement of the formers on the production line.

At least one of the first and second gripping members may be moveable relative to the other one of the gripping members for releasing the opposite first and second sides after the glove has been fully stripped. The actuation system may also comprise at least one actuator for driving movement of at least one of the first and second gripping members during release of the cuff end portion. Therefore, the actuation system may be configured to use the gripping members to release the cuff end portion after the glove has been fully stripped.

The horizontal movement of the gripping members in the first direction will then pull a finger portion of the glove downwards and around the abutment so that the entire glove is automatically rotated from the substantially vertical orientation on the former to a substantially horizontal orientation ready for depositing.

Prior to depositing, the gripping members open sufficiently to release the glove cuff end portion, which is pulled free from between the gripping members by friction as the glove finger portions are dragged across a surface on which the glove is to be deposited by the substantially horizontal movement of the gripping members.

During this process, it is advantageous if a blast of air is directed substantially downwardly at the finger portions. This helps to flatten the finger portions onto the surface on which the glove is to be deposited, following which, the cuff beaded end is pulled free from between the open gripping members.

For the avoidance of doubt, the term "finger portion" includes a thumb portion of the glove.

The apparatus will, therefore, in general be used in a cyclic manner, and after deposition of the fully stripped gloves the actuation system will move the gripping members back into an initial or starting position from which the next glove, or the next set of gloves, can be stripped from the formers.

The apparatus may comprise a glove deposition surface for receiving the released stripped gloves. The open space in which the first and second gripping members move substantially horizontally then preferably extends between the glove deposition surface and the abutment.

The movement of the first and second gripping members may have some downward component during stripping of the glove is that this will bring the first and second gripping members, and hence the cuff end of the glove held by the gripping members, closer to the glove deposition surface prior to release of the glove by the gripping members. An advantage of this is that it reduces the distance the glove has to drop when released, thereby helping to avoid creases such that the glove is deposited in a substantially flat orientation.

The apparatus may comprise a conveyor belt for conveying stripped gloves away from the gripper, the deposition surface being provided by a conveying surface of the conveyor belt.

Preferably, the first gripping member has a first gripping surface extending in a substantially horizontal direction for gripping the first side of at least one of the cuff end portions.

Preferably, the second gripping member has a second gripping surface extending in a substantially horizontal direction for gripping the second side of at least one of the cuff end portions during stripping of the gloves. The gripping members may then be oriented with respect to each other such that the first and second gripping surfaces face each other across the gap.

At least one of the first and second gripping surfaces may be convex, whereby a void is provided beneath the gap so that, in use, the beaded cuff end and adjacent cuff end portion are able to hang downwardly from the gap into the void.

The gripping members preferably grip the cuff end portion by relative movement of the first and second gripping members towards one another to narrow the distance across the gap, whereby the first and second gripping members are movable between:

(i) an open configuration for receiving in the gap the cuff end portion whereby the cuff end portion extends above and below the gap with the beaded cuff end located in the void beneath the gap; and (ii) a closed configuration in which the gap is narrowed sufficiently to block passage through the narrowed gap of the beaded cuff end but is not narrowed enough to hinder movement of the cuff end portion, so that during the stripping the cuff end portion is able to move in the gap until the beaded cuff end is caught by the narrowed gap.

This feature, in which the beaded cuff end is automatically lodged in the narrowed gap, therefore automatically aligns the beaded end of the stripped glove with respect the first and second gripping members prior to the glove gripper delivering the glove to the next processing stage, with the result that the glove can be delivered to the next processing stage in a predetermined and well-defined physical orientation.

The gap may extend along a second direction, the second direction being transverse relative to the first direction. Preferably, the abutment also extends substantially parallel with the second direction.

The first and second gripping members are preferably elongate on opposite sides of the gap.

In a preferred embodiment of the invention, the movement of the first and second gripping members to close the gap is in a substantially horizontal direction that is transverse to the second direction.

The void can be any convenient or practicable size or volume of open space and at a minimum need have a volume large enough just to accommodate the cuff end portion beneath the gap and a width sufficiently greater than the narrowed gap so that the cuff end portion is free to move in the void without the beaded cuff end becoming trapped or caught in the open space.

When the gap is widened to receive a cuff end portion, the gap has a first width and when the gap is narrowed to restrain a cuff end portion it has a second width. Preferably, the first width is at least 50 mm, and most preferably at least 100 mm so that a cuff end can be received in between the gripping members without interference from the gripping members Preferably the second width is no more than about 2 mm, and most preferably no more than about 0.75 mm. Preferably, the gap between the opposed gripping surfaces having the first width extends in a substantially horizontal direction.

Preferably, the gripping surfaces when moved relatively together present a downwardly opening funnel for channelling the beaded cuff ends into the constricted gap.

In the context of the present invention, a dip-moulded glove will be partially stripped from the former if one or more digits (fingers and/or thumb) of the dip-moulded glove are remaining, fully or partially, on the former, with the cuff end portion hanging freely downwards from the former, with an open end of the glove having a beaded cuff end and being lowermost.

Depending on the grade of glove, the material thickness of the cuff end portion will be between about 2 to 15 mils (50 µm to 375 µm). The beaded cuff end will normally be at least twice this thickness and is more commonly ten times this thickness. Many nitrile gloves are about 4.5 mil thickness (115 µm). The narrowed gap between the opposed surfaces will be sized to accommodate least double this thickness but be less than the thickness of twice the expected beaded cuff end thickness. For example, if the beaded cuff has a thickness of 20 mil (500 µm), then the narrowed gap should be no more than about 40 mil (1 mm).

The cuff end portion is therefore restrained such that the cuff end portion can move relatively upwards as the narrowed gap moves downwards towards the beaded cuff end.

Therefore, in general, the cuff end portion adjacent the beaded cuff end will have a first material thickness and the beaded end will have a second material thickness, the first thickness being less than the second thickness. The first material thickness is therefore less than or approximately equal to the narrowed gap second width and the narrowed gap second width is also less than about double the second material thickness of the beaded end, so that the beaded cuff end is caught by the narrowed gap, at least where the beaded thickness is doubled where the left and right sides of the cuff end fold back on itself.

It is preferred if at least the second gripping member is a rod. In a preferred embodiment, both the first and second gripping members are rods. In general, at least one of the gripping members will be moveable relatively apart with respect to the other one of the members for receiving the downwardly hanging cuff end. The gripper may then be movable towards a line of the formers in a third direction during receiving of the cuff end portion. This third direction is substantially opposite to the first direction.

Preferably, at least one actuator of the actuation system is configured to drive these movements apart and in the third direction prior to receiving of the cuff end portion between the first and second gripping members. The controller may then be arranged to control these movements apart and in the third direction during receiving of the cuff end portion.

The movement in the third direction is in a substantially horizontal direction during which the second gripping member is moved into contact with the first side of the downwardly hanging cuff end portion until the beaded cuff end rides over the second gripping member and into the gap between the first and second gripping members.

The first and second gripping members may be constrained to move in a substantially horizontal direction, and the actuation system comprises at least one actuator for driving movement of at least one of the first and second gripping members relatively apart from one another According to a second aspect of the invention, there is provided a production line for producing a plurality of elastomeric dip-moulded gloves, the production line comprising:

a plurality of dip-moulding formers;
a dip-moulding stage for coating and curing on said formers said gloves;
a partial glove stripping apparatus configured to partially strip said cured gloves from said formers such that a cuff end portion of each of said gloves hangs downwardly from said dip-moulding formers with a beaded cuff end of each of said gloves being lowermost, said cuff end portion having a first material thickness and said beaded cuff end having a second material thickness, said first thickness being less than said second thickness; and
a glove stripping apparatus configured to fully strip said partially stripped gloves from said formers; wherein
the glove stripping apparatus comprises an abutment and an actuator system for griping and stripping partially stripped gloves from the formers and a gripping device with opposed first and second gripping members, said abutment being located proximate a first side of said downwardly hanging cuff end portion and said gripping members providing opposed gripping surfaces on opposite sides of a gap where said gripping members are closest to one another, said gap having a width and the actuator system being configured to move said gripping members with respect to each other to vary the width of said gap;
and wherein the actuator system is configured to:
relatively move apart said gripping surfaces to increase the width of said gap and to position said gripping surfaces on opposite sides of the downwardly hanging cuff end portion of at least one glove and with the beaded cuff end of said at least one glove hanging in a void below said gripping surfaces;
relatively move together said gripping surfaces to restrain said the downwardly hanging cuff end portion of said at least one glove between said gripping surfaces; and
with said cuff end portion of said at least one glove restrained between said gripping surfaces, move said gripping surfaces substantially horizontally away from the former from which said cuff end portion hangs downwardly in a first direction towards and beneath said abutment in order to fully strip said gloves from said former.

Preferably, the actuator system is configured to:

relatively move together said gripping surfaces to restrain said cuff end portion between said gripping surfaces such that said gap is sufficiently narrow to block passage of the beaded cuff end through said gap while being sufficiently wide to allow passage of said cuff end portion;
move the gripping surfaces away from the former and in order to catch the beaded cuff end between the first and second gripping surfaces as the cuff end portion moves through the gap; and
with the beaded cuff end caught by the gap, move the gripping surfaces substantially horizontally away from the former and in a first direction towards and beneath the abutment in order to fully strip the gloves from the former.

According to a third aspect of the invention, there is provided a production line for producing a plurality of elastomeric dip-moulded gloves, the production line comprising:

a plurality of dip-moulding formers;
a dip-moulding stage for coating and curing on said formers said gloves;
a partial glove stripping apparatus configured to partially strip said cured gloves from said formers such that a cuff end portion of each of said gloves hangs downwardly from said dip-moulding formers with a beaded cuff end of said gloves being lowermost, said cuff end portion having a first material thickness and said beaded cuff end having a second material thickness, said first thickness being less than said second thickness; and
a glove stripping apparatus configured to fully strip said partially stripped gloves from said formers; wherein
the glove stripping apparatus is according to the first aspect of the invention.

The production line may further comprise a conveying surface for conveying stripped gloves away from the glove stripping apparatus, wherein the glove stripping apparatus is configured to repeatedly strip gloves from the formers and to deposit the stripped gloves on the conveying surface.

According to a fourth aspect of the invention, there is provided a method for fully stripping gloves from dip-moulding formers using a glove stripping apparatus when said gloves have already been partially stripped, each of said partially stripped gloves having a cuff end portion terminated with a beaded cuff end hanging downwardly from a corresponding one of said formers, the beaded cuff end being of thicker material than that of the cuff end portion, and the apparatus comprising an abutment proximate a first side of said downwardly hanging cuff end portion and a gripping device relatively movable with respect to said downwardly hanging cuff end portion, an open space extending beneath said abutment, said open space extending in a first direction away from a first side of said downwardly hanging cuff end portion, and the gripping device comprising at least two gripping members including a first gripping member and a second gripping member, said gripping members having respective opposed first and second gripping surfaces and being movable relative to each other, the method comprising the steps of:

positioning the first gripping member and the second gripping member to provide a gap between said opposed gripping surfaces where said gripping surfaces are closest to each other;
receiving in said gap between said opposed gripping surfaces the cuff end portion of at least one of said partially stripped gloves hanging downwardly from at least one of said corresponding formers;
moving at least one of the first gripping member and the second gripping member relative to said cuff end portion to narrow said gap until said cuff end portion is restrained between said opposed gripping surfaces with said beaded cuff end being below said narrowed gap;
moving the first gripping member and the second gripping member in said open space substantially horizontally in said first direction during said stripping thereby pulling said first side against said abutment so that a first stripped portion of said glove is pulled generally sideways between the gripping members and said abutment, and a second stripped portion of said glove is pulled generally downwards between said former and the abutment, until said glove is fully stripped by said substantially horizontal movement of the first gripping member and the second gripping member.

The width of the narrowed gap between the opposed gripping surfaces is such that the cuff end portion but not the beaded cuff end is free to move within the gap so that the restrained cuff end portion moves towards the narrowed gap as the first stripped portion of the glove is pulled generally sideways until the beaded cuff end is lodged in the narrowed gap.

The method may comprise, after the glove has been fully stripped, the step of moving apart the first gripping member and the second gripping member to release the stripped glove in a substantially horizontal orientation onto a glove deposition surface.

A particular advantage of the invention is that generally downward movement of the glove as this is being stripping from the former is translated into generally horizontal movement by the abutment.

To achieve this effect, the abutment preferably changes the direction in which the glove is pulled by between about 45° and 90°, and most preferably between about 60° and 80°.

Preferably, prior to receiving in the gap between the opposed gripping surfaces the downwardly hanging cuff end portion, the method comprises:

with both the first and second gripping members on the first side of a subsequent glove to be stripped, positioning the first gripping member and the second gripping member to provide a gap between the opposed gripping surfaces that is sufficiently wide to receive the downwardly hanging cuff end portion of the subsequent glove;

and then moving at least the second gripping member in a substantially horizontal direction towards the first side of the downwardly hanging cuff end portion of the subsequent glove until the second gripping member is moved into contact with the first side until the beaded cuff end rides over the second gripping member and into the gap between the first and second gripping members.

According to a fifth aspect of the invention, there is provided a production line process for producing plurality of elastomeric dip-moulded gloves, each glove having a digit portion and a cuff end portion, said cuff end portion terminating at a beaded cuff end, the production line comprising a plurality of dip-moulding formers on a conveying apparatus, a dip-moulding stage, a partial glove stripping stage and a full glove stripping stage, the process comprising using the conveying apparatus to move the dip-moulding formers sequentially through:

the dip-moulding stage in which a resin is coated and cured on said formers to form said gloves;

the partial glove stripping stage in which said beaded cuff end is formed at a terminal end of the cuff end portion following which the cuff end portion of each of said gloves is stripped from said formers to hang downwardly from said formers with the beaded cuff end of each of said gloves being lowermost, said cuff end portion having a first material thickness and said beaded cuff end having a second material thickness, said first thickness being less than said second thickness; and the full glove stripping stage, in which partially stripped gloves are fully stripped from said formers using the method according to the fourth aspect of the invention.

The production line may further comprise a conveying apparatus for transporting the formers from the dip-moulding stage to the glove stripping apparatus and a conveying surface for conveying stripped gloves away from the glove stripping apparatus. The glove stripping apparatus may then be configured to repeatedly strip gloves from the formers and to deposit the stripped gloves on the conveyor.

BRIEF DESCRIPTION OF THE DRAWINGS

The invention will now be further described, by way of example only and with reference to the accompanying drawings, in which:

FIG. 4 is a side view of part of the glove stripping apparatus of FIG. 3;

DETAILED DESCRIPTION

Figure 1:
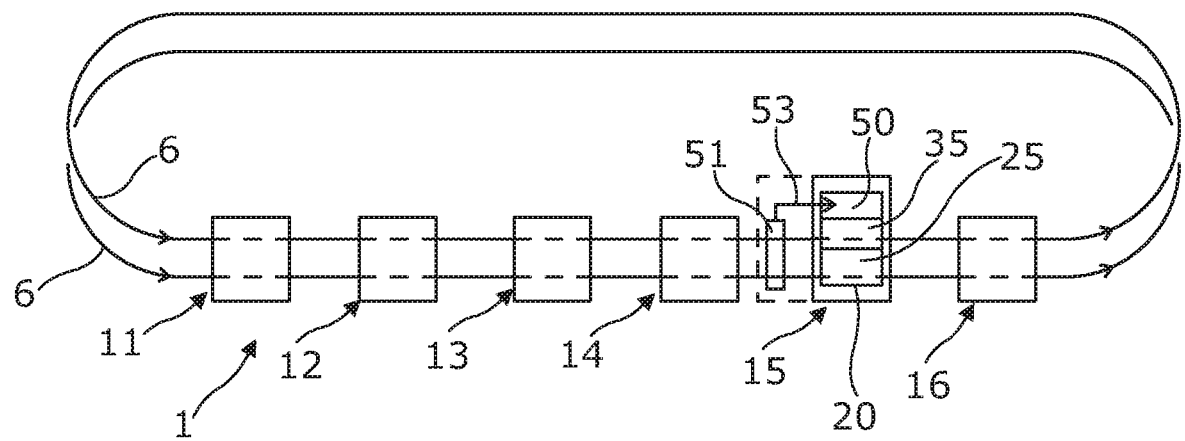
FIG. 1 is a schematic diagram of a production line according to preferred embodiments of the invention, for producing a plurality of hollow elastomeric gloves, which in this example are disposable nitrile gloves, the production line having a pair of tracks which pass through a series of process stages.
Figure 2:
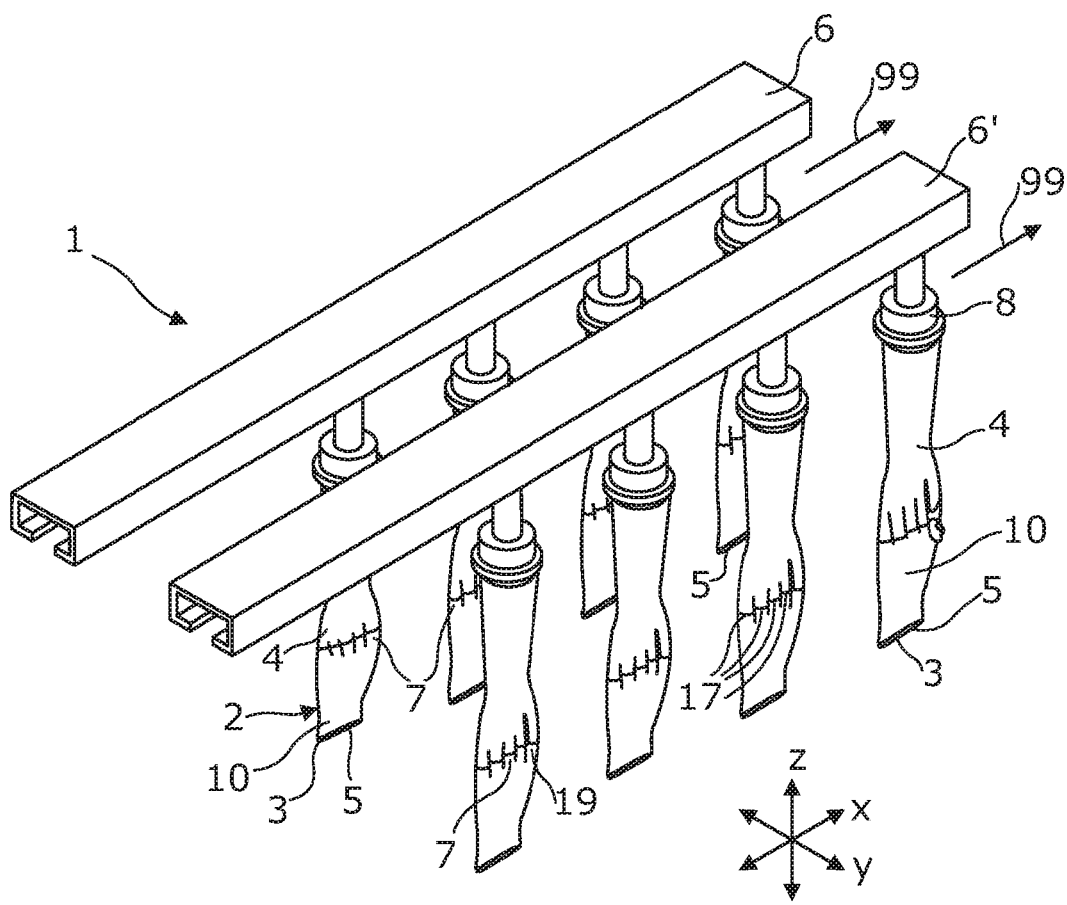
FIG. 2 is a perspective view of a segment of the production line of FIG. 1, showing how each track has a plurality of downwardly hanging hand-shaped formers on each of which has been dip-coated a glove, each glove having been cured and partially stripped so that a glove cuff end portion hangs downwardly with a beaded cuff end being lowermost.

FIG. 1 shows a schematic diagram of a production line 1 and FIG. 2 shows a perspective view of a segment of the production line for use in the embodiments of the invention described in detail below. The production line has a conveying apparatus, which in this example is a pair of track conveyors 6, 6' which convey a series of downwardly hanging dip-moulding formers 4 on which gloves 2 have been dip-moulded and subsequently cured. In this example, the formers are spaced apart on 200 mm centres.

The gloves 2 are made from an elastomeric material, and in this example are disposable nitrile inspection gloves for use in medical, dental, veterinary or food preparation applications, however, the principles of the invention are applicable to other types of dip-moulded gloves of a similar thin, flexible and elastomeric material and having a beaded end 3. The gloves are formed on dip-moulding formers 4 using production processes which will be familiar to those skilled in the art. In this example, there are two parallel tracks 6, 6' each of which carries a chain (not shown) from which hangs a regularly spaced series of mounts 8, one for each former. Each line of formers 4 moves at a steady forward speed 99.

The movement of the formers 4 along the tracks defines a horizontal longitudinal direction and at right angles to this a horizontal transverse direction. In FIG. 2 these directions are labelled as, respectively, x-axis and y-axis, with the vertical direction being labelled as z-axis.

The formers 4 pass through a number of previous process stages prior to reaching the glove stripping apparatus of the invention, and these previous process stages are all well known in the art. The main stages include a dip clean stage 11 in which formers are dipped in an acid bath so that the formers are cleaned of all residues. The cleaned formers then pass to a dip-coating stage 12, followed by a curing stage 13 to form a glove 2 on each former 4. Together, the cleaning, dip-coating and curing stages can be said to provide a dip-moulding stage.

Following the dip-moulding stage, the gloves' cuff ends are rolled back in a first part of a partial glove stripping stage 14 to provide the beaded end 3 at a terminal end opening 5 of each glove 2. Because the beaded end is formed of a rolled up portion of glove material, the beaded end is thicker than an adjacent cuff portion 10 of the glove. The bead 3 provides mechanical strength to the cuff terminal end 5 in use, but is also helpful when the glove is then to be partially stripped from the former 4.

As shown in FIG. 2, each glove 2 has already been partially stripped from its former 4 in the partial glove stripping stage 14 of FIG. 1. One known way of doing this, not shown in the drawings, is to introduce a blade under an end portion of the glove, which is here the cuff portion 10 of the glove, and then to blow or pull, the edge of the cuff towards a finger or digit portion 7 of the glove. This tends to retract and fold the glove back on itself. Using known techniques, it is possible to do this in a production environment such that some, or preferably the entire digit portion 7 of the glove remains attached to the former 4, and so that the glove beaded end 3 and adjacent cuff portion 10 hang freely downward under the weight of these detached glove portions.

The finger portion or digit portion 7 of the glove consists of four glove fingers 17 and one glove thumb 19. Preferably, these portions are symmetrical between opposite first 9 and second 9' glove sides (see FIGS. 5B and 17 to 20), so that each glove is ambidextrous, that is, equally suitable for donning on either the left hand or right hand of a user.

The partial glove stripping station or stage 14 is then followed by a full glove stripping station or stage 15, preferred embodiments of which are described in detail below. In known production systems, this stage is often a manual process where workers manually pull and strip the gloves from the formers 4. Alternatively, it is known to use a pair of oppositely rotating rollers or belts having a pair of opposed rolling surfaces which firmly grip therebetween the cuff end portion 10 and pull the glove fully from the former and eject the glove in a downwards direction. The ejected glove then falls, for example, on a roughly formed growing pile of gloves directly beneath each pair of rollers, such as described in CN 202439169 U or onto a moving belt conveyor as described in WO 2014/122595 A1. Such known production systems grip the downwardly hanging cuff portion 10 wherever this happens to be, in the vertical z-axis direction, with a consequent variation in the location or timing of eventual ejection of the glove from the rotating rollers or belts.

As can be seen from FIG. 2, a feature of known partial glove stripping apparatuses is that the amount of the glove cuff or end portion 10 hanging downwardly from the former 4 varies from former to former. Although not shown, it is possible that some gloves may not be successfully partially stripped from the former such that the glove is not fully stripped by the subsequent full stripping stage 15. Therefore, it is usually the case that there is a need for a final manual process stage 16 in which a worker can pull off any gloves still on the formers.

Another consequence of the unevenness of partial stripping is that it is difficult in known full stripping processes to ensure a regular placement of the fully stripped glove in the location where the glove is deposited, for example a static, growing pile of gloves or a moving conveyor belt.

Figure 3:
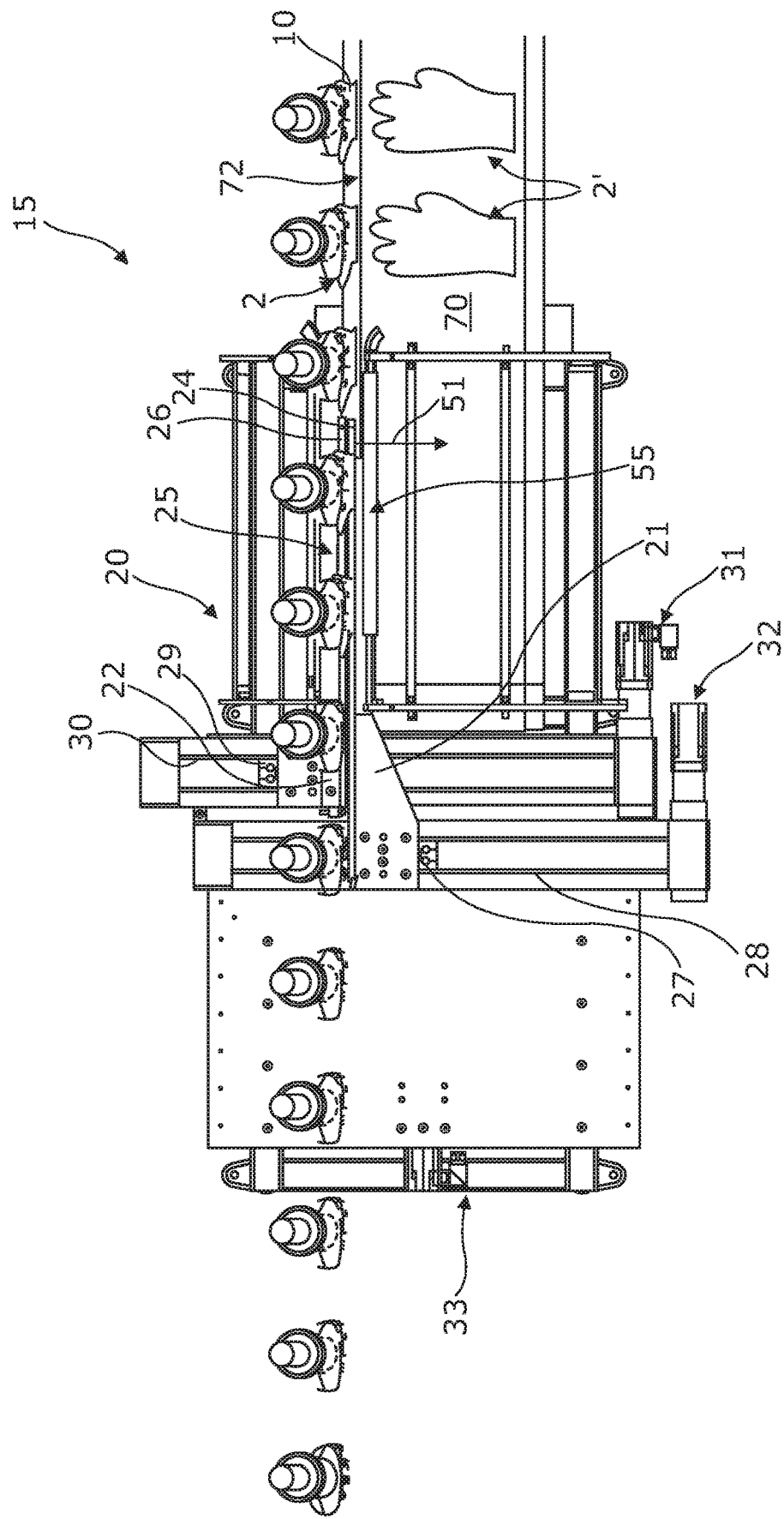
FIG. 3 is a top plan view of part of a glove stripping apparatus in a first preferred embodiment of the invention.

FIGS. 3 and 4 show a preferred embodiment of the invention in which a full glove stripping station or stage 15 has a glove stripping apparatus 20 with a gripping device 25 for fully stripping a partially stripped gloves 2 from the dip-moulding formers 4. The construction of the gripping device 25 and operation of the glove stripping station 15 is shown in more detail in FIGS. 5A, 5B and 6 to 21. As will be explained below, each gripping device comprises first and second glove gripping actuators 31, 32 for driving movement in the y-direction and a third actuator 33 for driving movement in the x-direction.

An associated controller 50 (FIG. 1) synchronises control of the movement provided by the three actuators 31, 32, 33.

Figure 16:
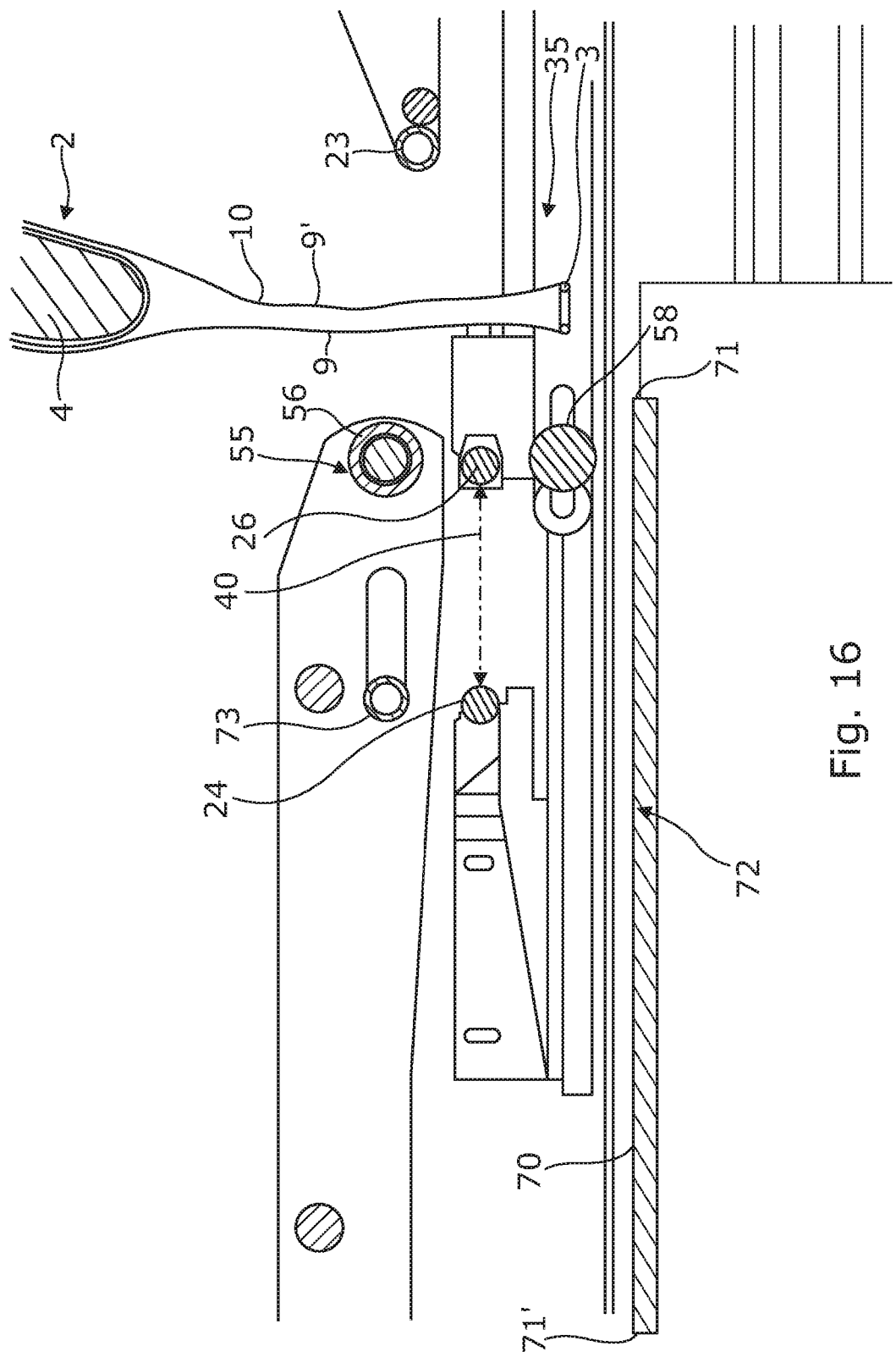
FIG. 16 is a section similar to FIG. 5A, showing an alternative way to that of FIGS. 13 to 16 of how the first and second gripping members may be moved to receive the subsequent cuff end portions to be stripped, in which the gripping members are in the open configuration with both spaced transversely and horizontally away from the first side of the downwardly hanging cuff end portion.
Figure 17:
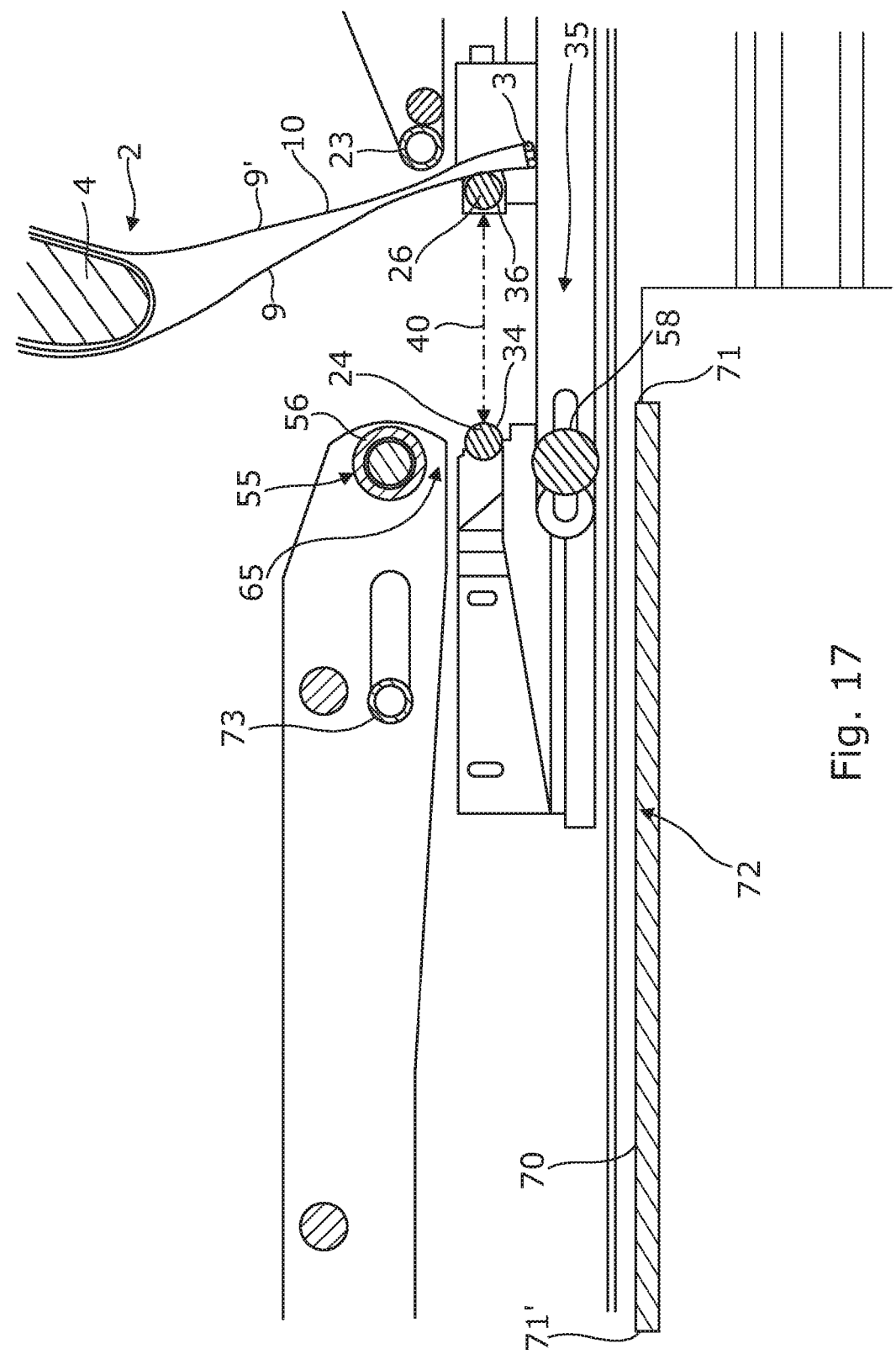
FIG. 17 follows from FIG. 16, showing how the second gripping member is moved horizontally in the second direction so that it passes beyond the vertical plane in which the cuff end portion is hanging.
Figure 18:
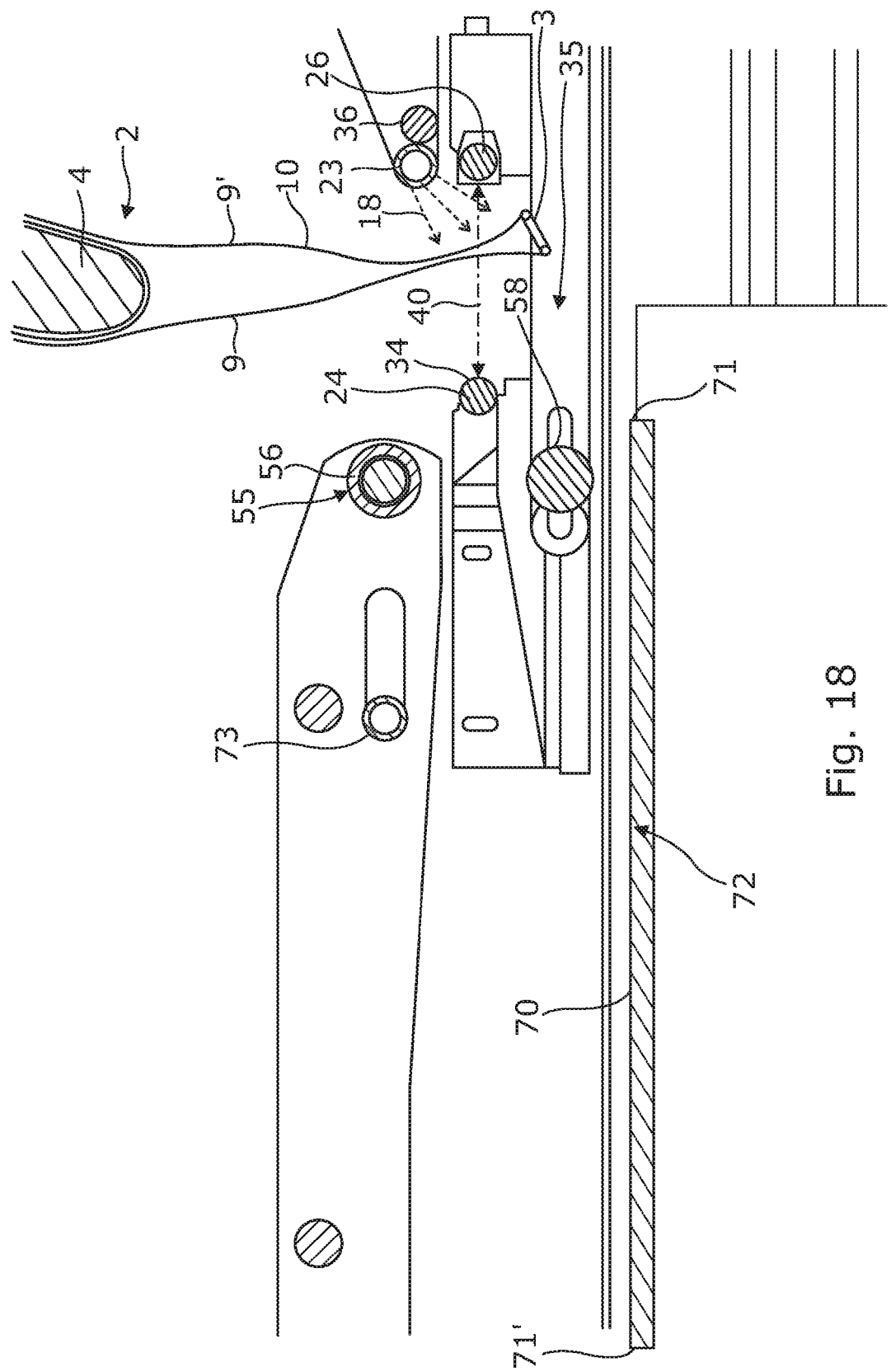
FIG. 18 follows from FIG. 17, showing how the second gripping member continues to moved horizontally in the second direction until the cuff end portion, aided by a jet of air from an air bar, rides over the second gripping member into the gap between the gripping members.
Figure 19:
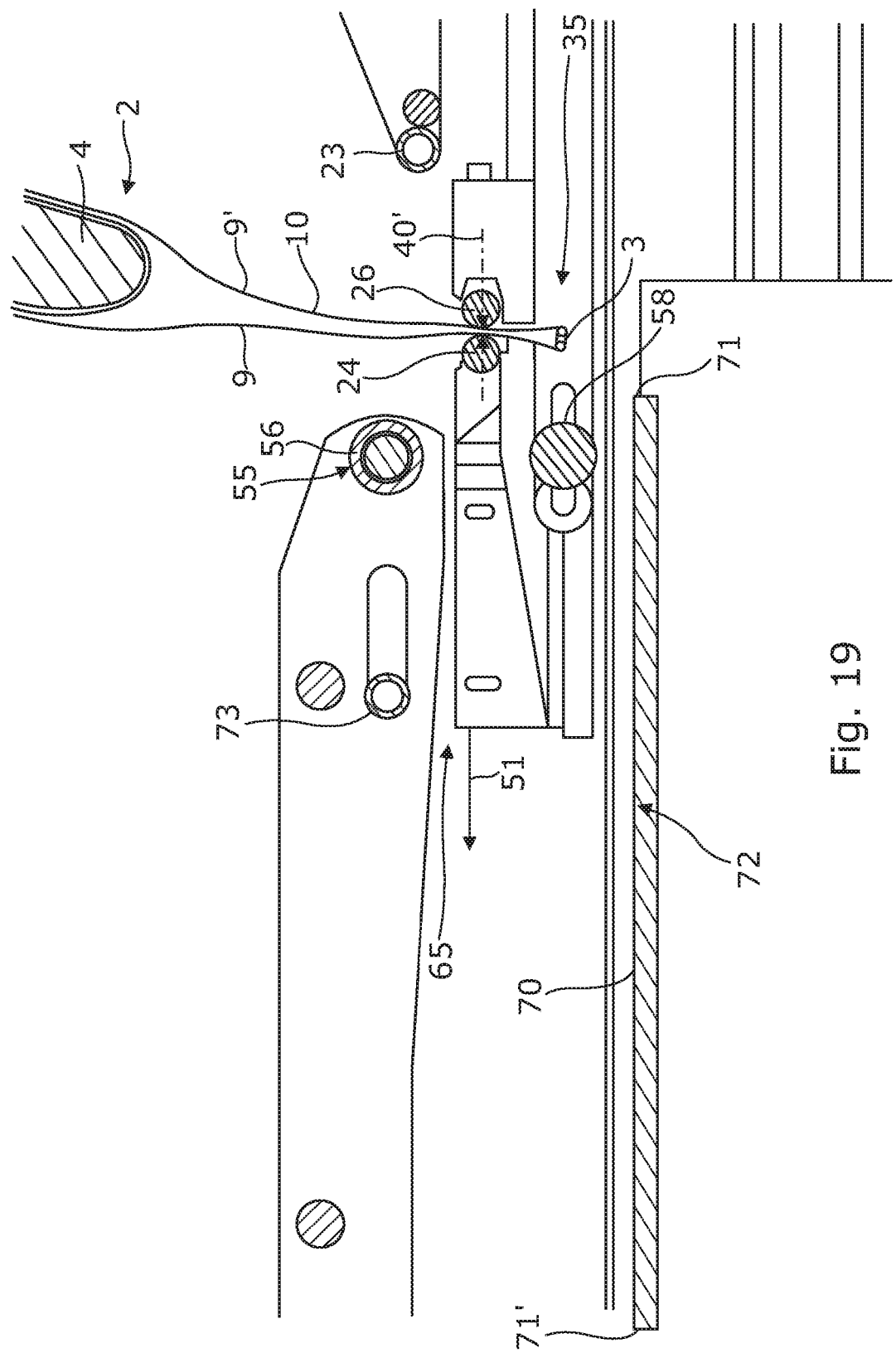
FIG. 19 shows in detail how, when the restrained cuff end portion is pulled horizontally, the beaded cuff end moves upwards towards the constricted gap.

There are limits to the speed of movement of the stripping apparatus, and therefore, for the sake of efficiency, each gripping device 25 is preferably configured to strip gloves 2 from just one of the two dip-moulding production line tracks 6, 6', rather than from both. Other types of glove stripping apparatus, for example, as described in WO 2016/139640 A1, may need more than one gripping device for each production line track. The illustrated example is, however, capable of stripping every glove from one production line in two variations of operation, one of which is shown in FIGS. 6 to 15 and the other of which is shown in FIGS. 16 to 18.

In both examples, the illustrated gripping device 25 is capable of stripping and depositing two adjacent gloves at the same time every 0.86 s. Current production lines for dip-moulded gloves typically produce up to about 10,000 gloves per hour per track, which equates to the dip-moulding formers 4 moving along each track 6, 6' at a speed of one glove every 0.36 s. With a glove spacing centre-to-centre of 200 mm, the typical track speed is up to about 1.8 m/s. Therefore, at this line speed, a glove stripping apparatus having a cycle time of 0.86 s and having a single gripping device as illustrated is capable of stripping every glove, and so in practice the apparatus has 0.14 s spare in its cycle time. It is, of course, possible to reduce the cycle time with the use of lighter-weight materials or more powerful motors driving the stripping actuator. However, a single gripping device will be less expensive than several, even if one controller is used to control both, and so if it were necessary to increase throughput, then the apparatus could be modified by increasing the length of the first and second gripping members, also referred to herein as grippers, so that more than two gloves are stripped at the same time. The skilled person will appreciate that the principles of the invention are equally applicable to gripping devices having gripping members 24, 26 of lengths different to those illustrated, and may be employed to strip just one glove at a time.

The gripping device 25 has, in this example two gripping members, namely a first gripping member 24, and a second gripping member 26 which are movable relative to each other in the transverse or y-direction. Each gripping member 24, 26 extends substantially horizontally in the longitudinal or x-direction and each is preferably at substantially the same level as the other. The gripping members are also preferably straight and parallel with respect to each other and also preferably substantially parallel with the longitudinal direction of movement along the x-axis of the formers 4 along the production line tracks 6, 6'. As shown in the drawings, the gripping members are thus separated in the transverse y-axis direction by a clear gap of varying widths 40, 40', 40", the size of the gap being the distance across the gap where the separation between the first and second gripping members is at a minimum. In this example, the gap is a slot between the two gripping members. Each gripping member 24, 26 provides a corresponding gripping surface 34, 36 that is inwardly directed across the gap 40, 40', 40" towards the other gripping surface. When the gripping members are moved to an open configuration in which these members are relatively far apart, the gap has a first width 40 and when the gripping members are moved to a narrowed or constricted configuration in which these members are relatively closer together, the gap has a second width 40'. The second width is therefore less than the first width.

Beneath the gap is an open space or void 35. The open space extends beneath the gripping surfaces along the full longitudinal length of the opened gap 40. The opened gap therefore presents an upwardly facing opening for receiving between the gripping surfaces 34, 36 and within the open space 35 the downwardly hanging cuff end portion 10. In this example, there are just two gripping members, each of which extends continuously on either side of the opened gap 40 for gripping two gloves at a time. It would, however, be possible to provide a greater number of gripping members, for example several separate gripping members spaced apart in the longitudinal direction, or alternatively extend the length of each gripping member if more gloves were to be gripped at a time.

The first and second gripping members 24, 26 are relatively movable with respect to each other so that the gap may be either narrowed 40' or opened up 40. In this example, the first gripping member is mounted to a first supporting arm 21 affixed to a linearly movable first carriage 27 which slides horizontally in the y-direction on a first track 28. The second gripping member 26 is mounted to a second supporting arm 22 affixed to a linearly movable second carriage 29 which slides horizontally in the y-direction on a second track 30. Both tracks 29, 30 are affixed to a movable support which is itself slideable horizontally in the x-direction.

In this embodiment, the gripping members are not movable in the z-direction, and so the movement is confined to a horizontal plane. It would, however, be possible to add an extra degree of freedom of movement to the gripping members, for example, either by raising and lowering the entire assembly on which the gripping members are supported or by pivoting the supporting assembly about a longitudinal axis. As opposed to a 3-axis actuator, for example as disclosed in WO 2016/139640 A1, this greatly simplifies the construction of the glove stripping apparatus. This does mean, however, since in general it would be difficult to provide machinery to controllably move the formers 4 along the z-axis, that the downwardly hanging open cuff ends must enter into the gap in a horizontal direction relative to the first and second gripping members. The alternative variations of operation explained below illustrate two ways of doing this.

The opened gap 40 extends longitudinally from the carriages 27, 28 and tracks 29, 30 and in one embodiment presents an open end 41 (FIG. 13) which faces towards the on-coming cuff ends 10. A gap which is open to the upstream side of the former production line 6, 6' may facilitate entry of the cuff end into the gap, along the y-direction. This requires that the movement of the third actuator in the y-direction is of sufficiently great extent, that the open end 41 can be moved into position in time to receive in the y-direction the next glove or gloves to be stripped. This mode of operation is illustrated in FIGS. 6 to 15.

In FIGS. 16 to 18, instead of admitting glove cuff ends into the gap through the open end 41, a variation of the invention moves the second gripping member 26 in the x-direction up against and then beyond the first side 9 of the downwardly hanging cuff end, until the cuff end rides over the gripping member and drops into the opened gap 40. An air bar 23 blasts a jet of air 18 generally towards the gap to help push the cuff end portion 10 over the second gripping member 26. The first gripping member 24 may be moved in this same direction at the same time, so that the width of the gap is constant during this phase of the cycle. Once the cuff end 10 is within the gap, then one or both of the gripping members 24, 26 can be moved inwards to restrict the gap 40'.

It should be noted, however, that these two ways of admitting glove cuff ends between the opened gripping surfaces are not mutually exclusive, and could be used in combination. For example, the gripping members could move towards the line of downwardly hanging cuff ends before all cuff ends are aligned longitudinally with the gripping members. Then, when moving transversely, the second gripping member 26 may press up against just one glove, (or two gloves if three gloves are being removed at a time, instead of just two, as in the present example). The next glove would initially be outside the longitudinal reach of the gripping members. The gripping members would then be held in position until the next glove cuff end had moved into position between the gripping members, following which the members would move until the gap was in the narrowed configuration 40'.

The gripping members 24, 26 are convex in a transverse plane extending above and below the gap. In this example, these gripping members are rounded, rod-like or ridge-like protrusions or projections, preferably part-cylindrical on the side facing towards the gap, that extend parallel to one another in the longitudinal direction. In this example, the gripping members are cylindrical rods, which has the advantage of maximising strength while minimising mass. Preferably, the gripping surface 34, 36 of at least one gripping member 24, 26 overhangs the open space or void 35 beneath the gap 40 when the gap is in the open configuration. The corresponding gripping surfaces 34, 36 when moved relatively closer present a downwardly oriented funnel which leads to a constriction at the narrowest part of the gap.

As shown in FIGS. 5B, 6, 7 and 19, after the first and second actuators 31, 32 move the gripping device 25 into position to receive a glove cuff end portion 10, and once received between the gripping members 24, 26, the actuators 31, 32 move the first and second gripping members towards one another to reduce the size of the gap to a second width 40' less than the first width 40 such that the constricted gap is just wide enough for the cuff end portion 10 to move freely through the gap without any binding or any hindrance from the opposed gripping surfaces 34, 36. In general, inside the narrowed gap 40' one or more clearance gaps will remain in the three interfaces between the opposed gripping members 24, 26. Where the gripping surfaces of the restricted gap are closest together, these interfaces are: the two interfaces 43, 43' between the glove opposite external first and second surfaces 9, 9' and the opposed gripping surfaces 34, 36, and the interface 43" between the glove internal surfaces 9" inside the hollow cuff end portion.

It would, however, be possible for there to be some contact and some resulting friction between the cuff end portion 10 and the gripping surfaces 34, 36 in the constricted gap 41', particularly if both gripping surfaces were on rollers free to rotate in response to such friction. In all cases, the cuff end portion is then restrained, but free to move at least in an upwards direction, between the opposed gripping surfaces 34, 36 with the beaded cuff end 3 being below the narrowed or constricted gap 40'.

As shown in FIGS. 8, 9, 19 and 20, the first and second actuators 31, 32 then move the first and second gripping members 24, 26 horizontally in a first direction 51 away from the line of formers 4 so that the restrained cuff end portion 10 moves upwards relative to the narrowed gap 40' until the beaded cuff end 3 is caught by (i.e. jammed within) the narrowed gap which is effectively at the neck of a downwardly opening funnel having opposite part cylindrical sides.

Figures 5A, 5B:
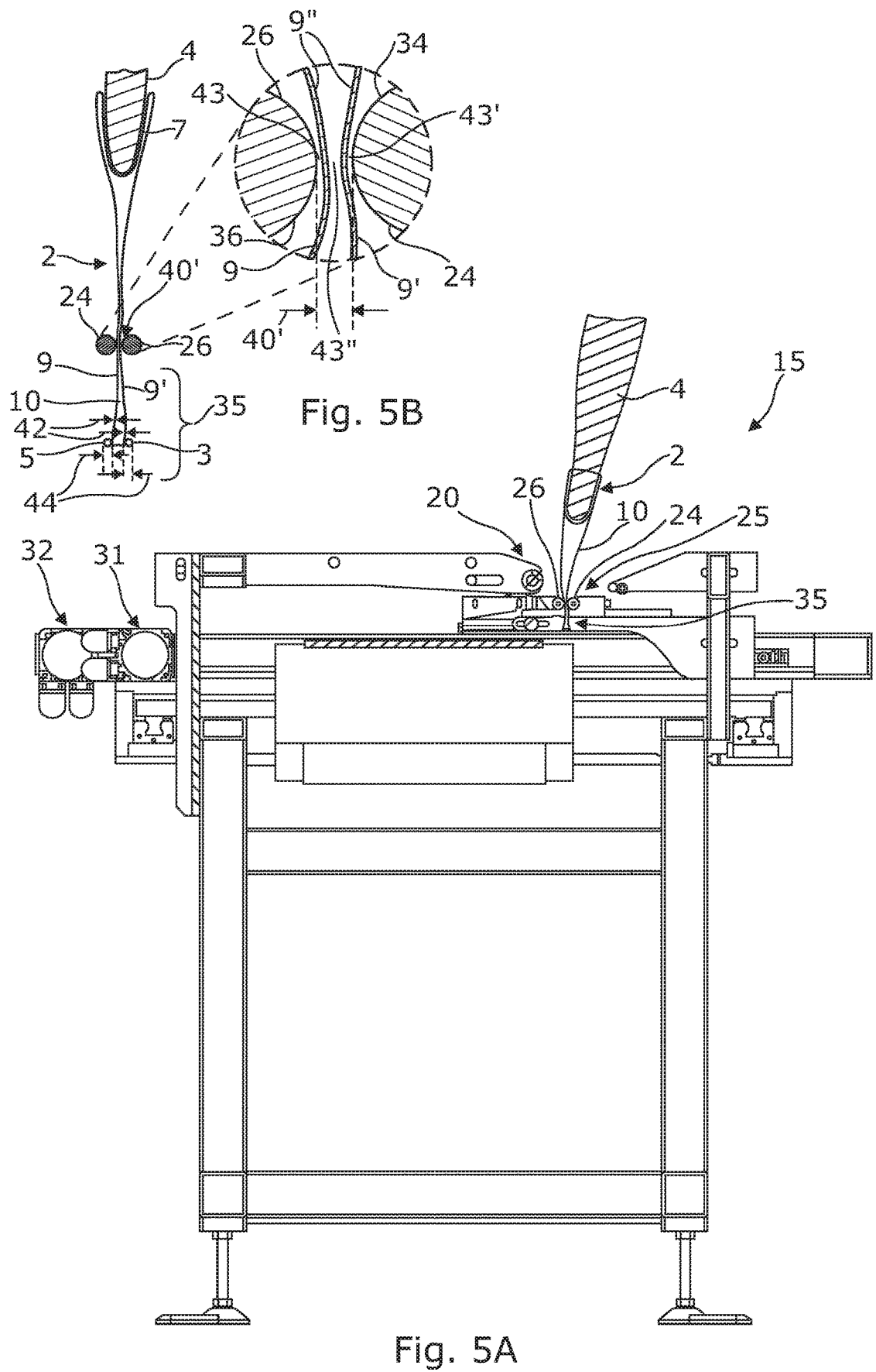
FIG. 5A is a section in a vertical plane through line V-V of FIG. 4, when a first gripping member and a second gripping member of the apparatus have moved together into a closed orientation to restrain a downwardly hanging cuff end portion between opposed gripping surfaces of said members.
FIG. 5B is an enlarged view of the cuff end portion, showing how this terminates in a beaded cuff end and how a gap between the gripping members when in a narrowed orientation loosely restrains opposite first and second sides of the cuff end portion.
Figure 6:
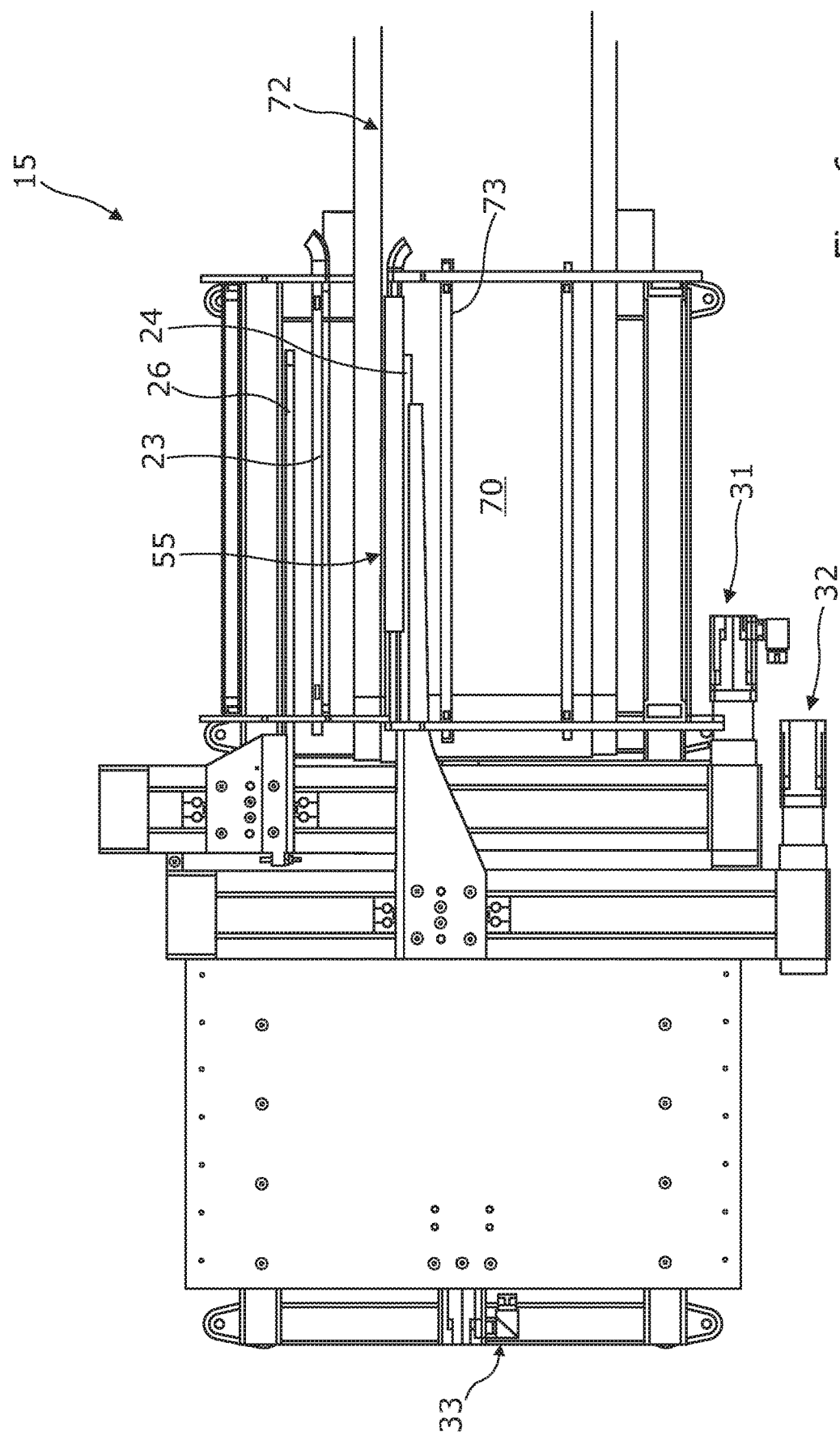
FIG. 6 shows a top plan view of the glove stripping apparatus of FIG. 3, in a first preferred mode of operation, with the first and second gripping members in position and in an open orientation for receiving therebetween the cuff end portion.
Figure 7:
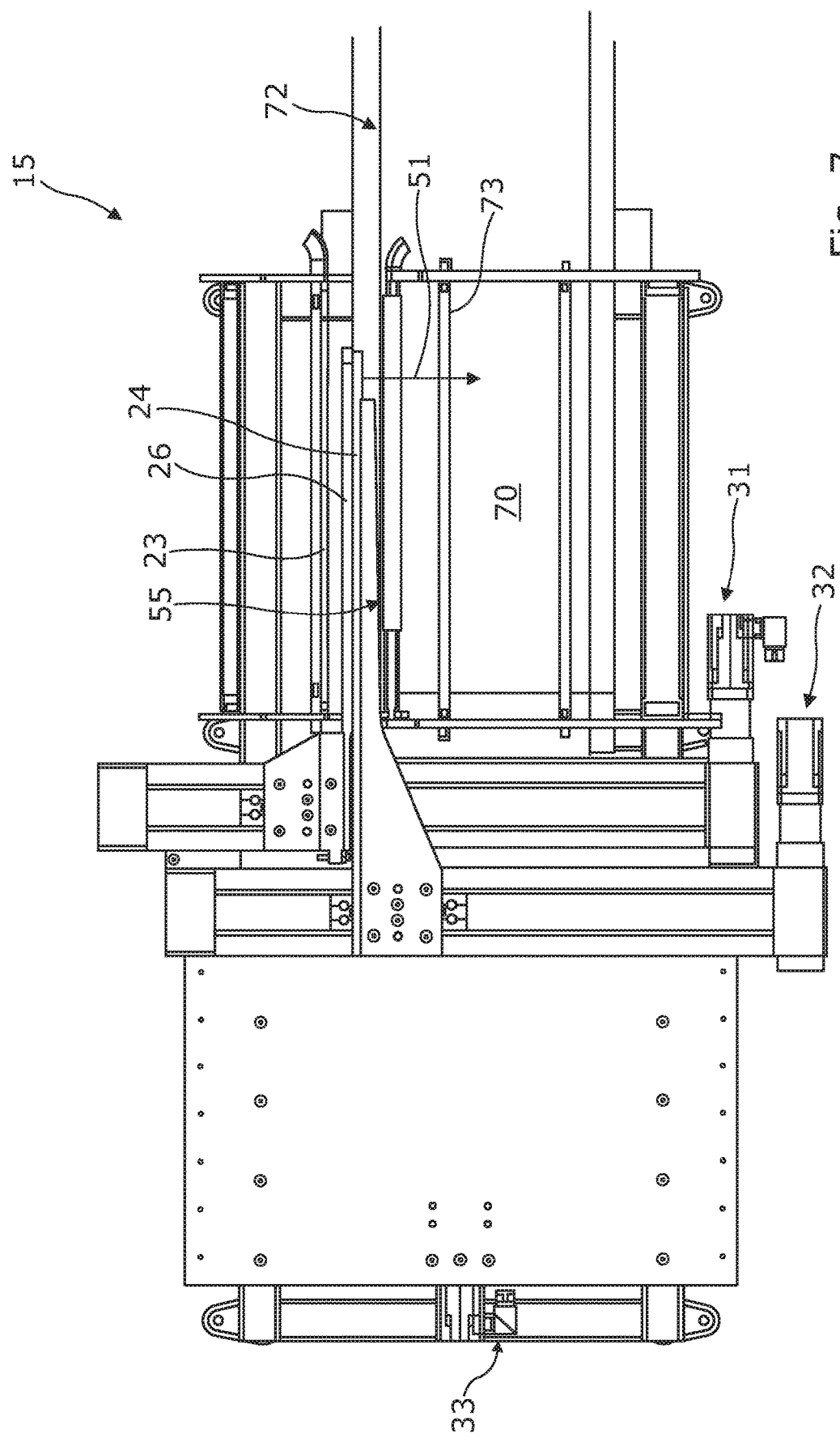
FIG. 7 follows from FIG. 6, and shows the first and second gripping members moved to the narrowed orientation, as in FIGS. 5A and 5B.
Figure 8:
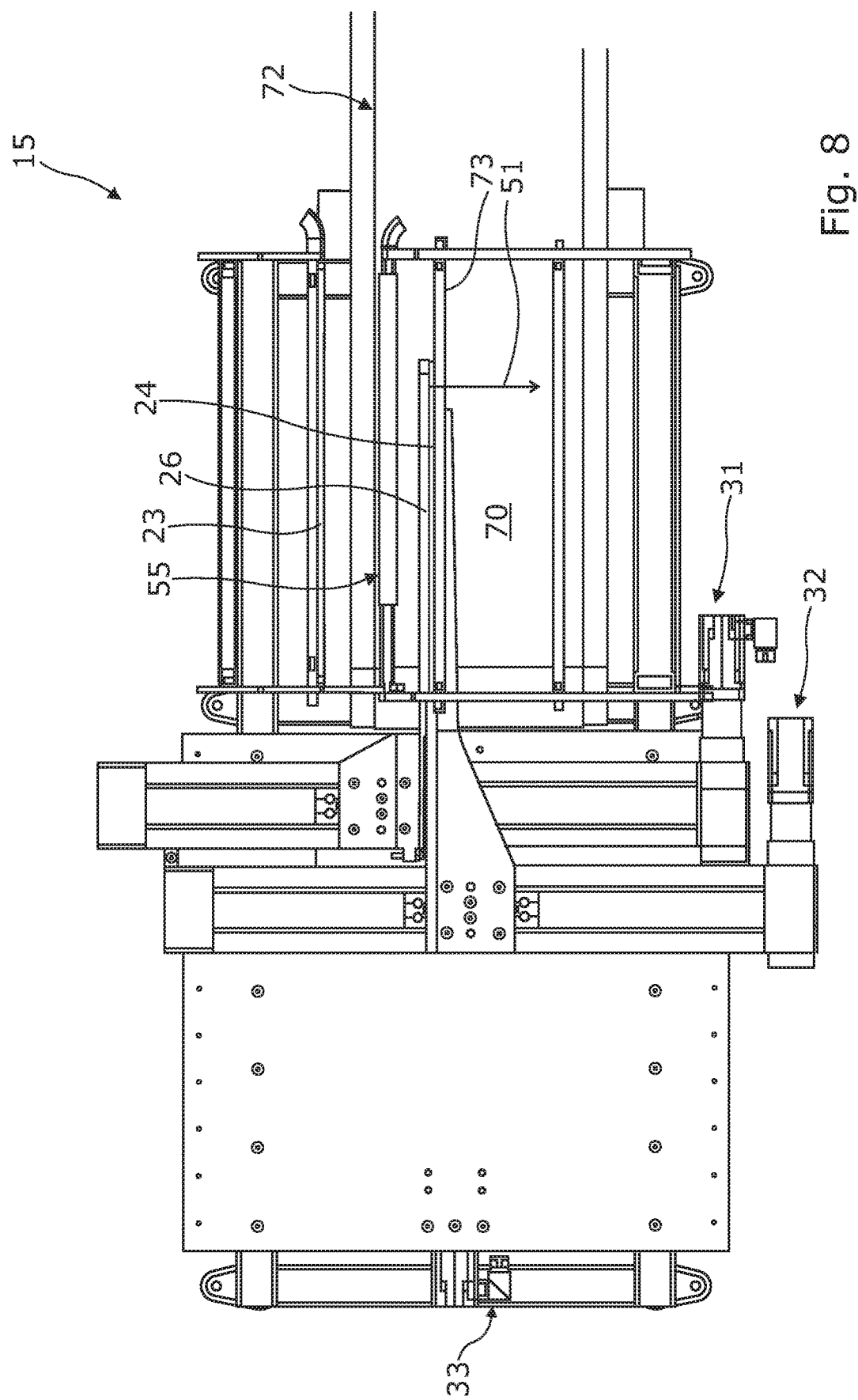
FIGS. 8 and 9 follow sequentially from FIG. 7, and show the gripping members in the narrowed orientation moving in a first direction horizontally away in a transverse direction from the line of formers, while tracking the longitudinal movement of the formers.

In this regard, it can be seen in FIG. 5B that the cuff end portion 10 of the glove has a first material thickness 42 and the beaded end 3 has a second material thickness 44, the first thickness being less than the second thickness. These material thicknesses 42, 44 are essentially the sums of the thicknesses of the opposite sides of the hollow glove when these are pressed together, as would be the case when passing through or pressing against the surfaces 34, 36 of the constricted gap 40'. In FIG. 5B these first and second thickness are represented, respectively, by two pairs of arrows 42, 44.

Figure 9:
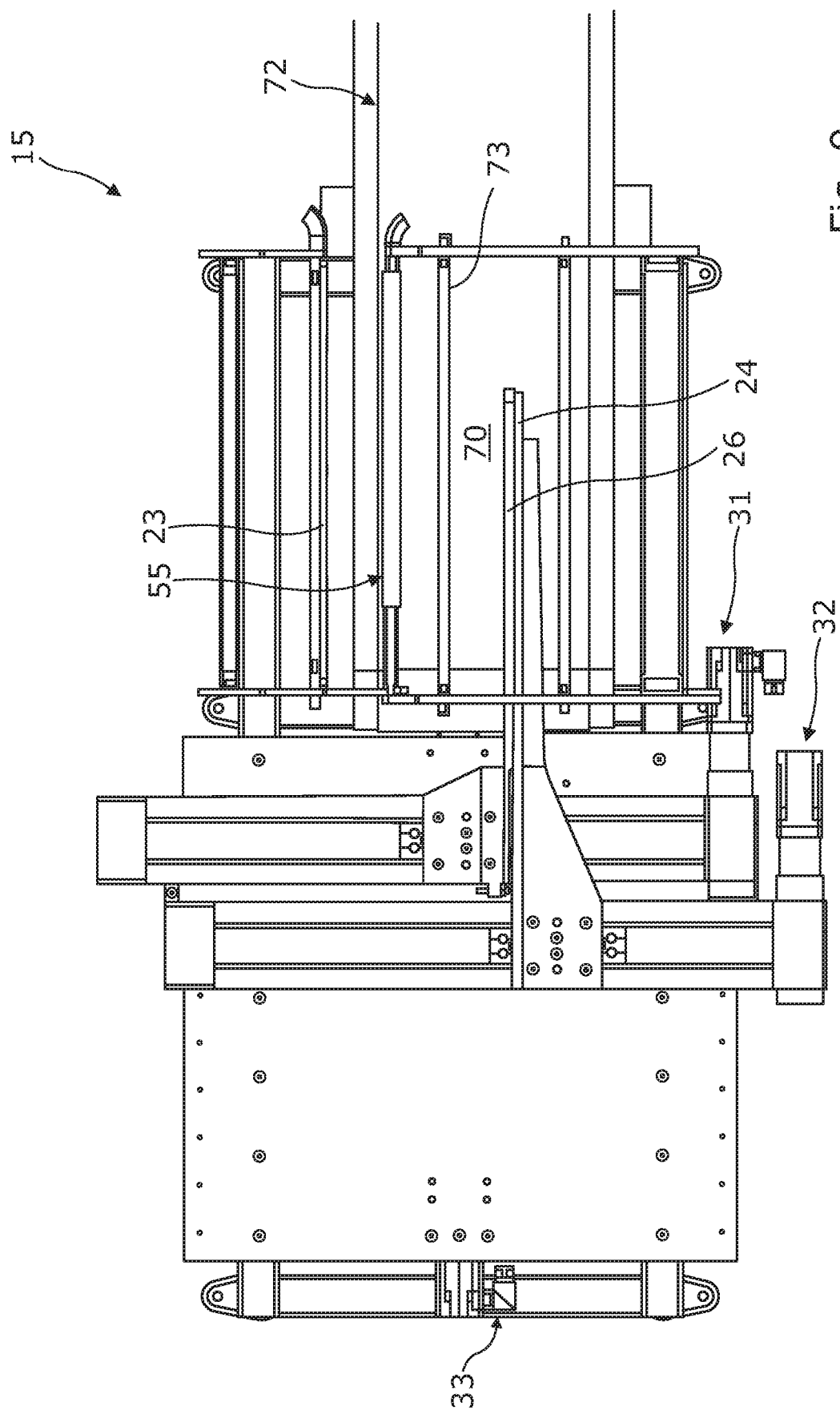
Figure 10:
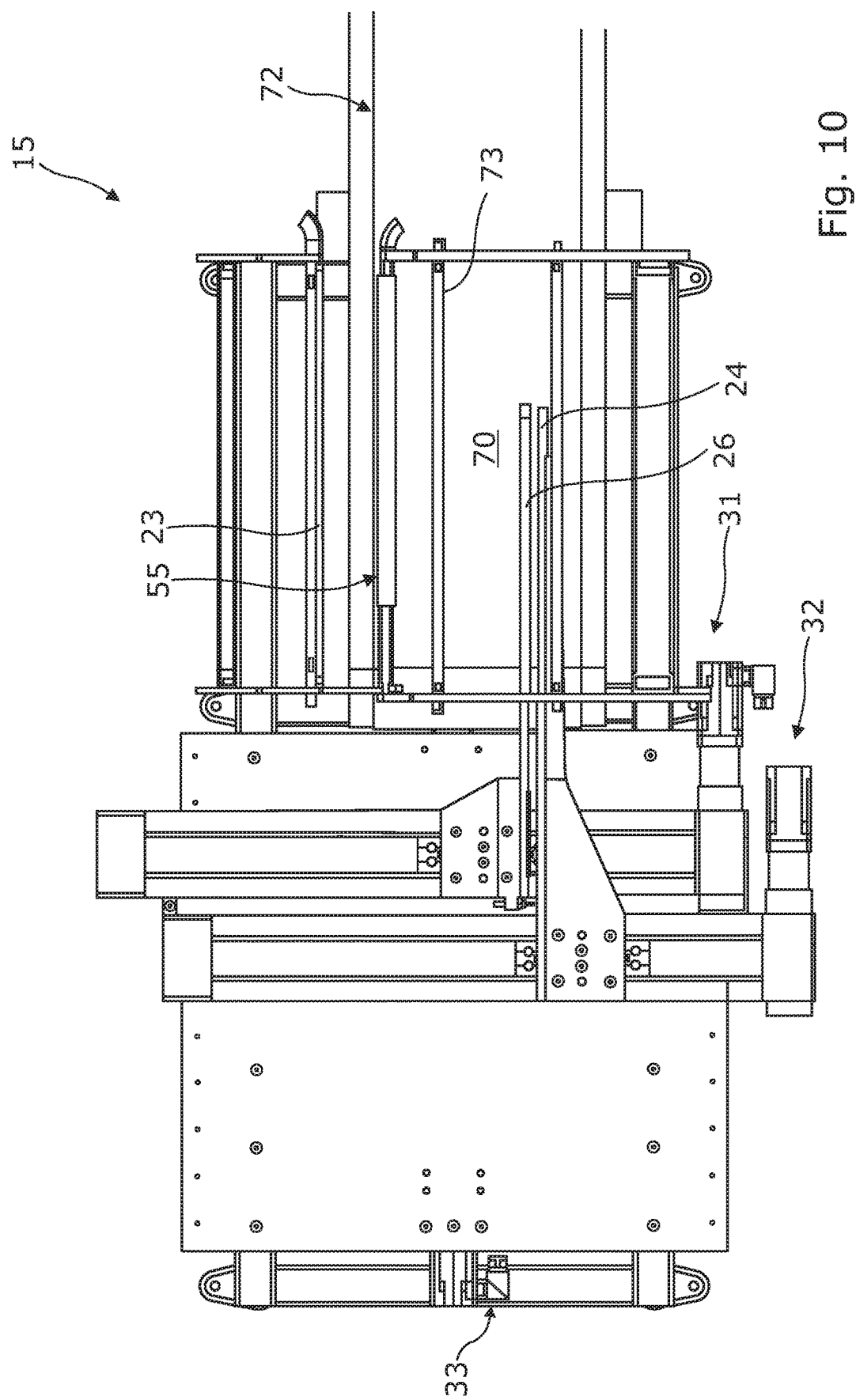
FIG. 10 follows from FIG. 9, showing how the first and second gripping members open to release the glove cuff end, once fully moved in the first direction, in order to deposit a glove on a conveyor belt.
Figure 11:
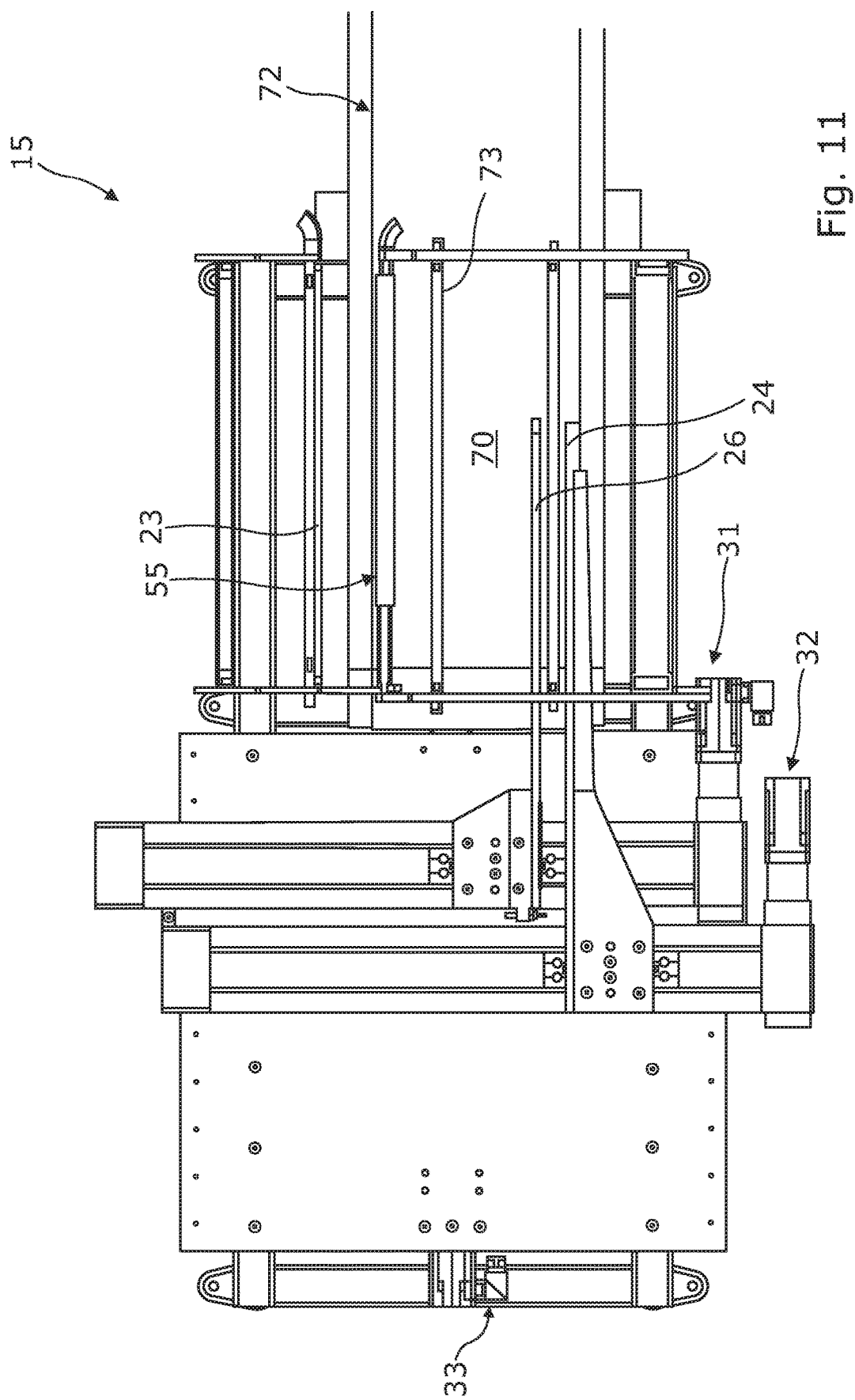
FIG. 11 follows from FIG. 10, showing how the first and second gripping members are moved backwards in an x-direction after release of the glove on the conveyor.
Figure 20:
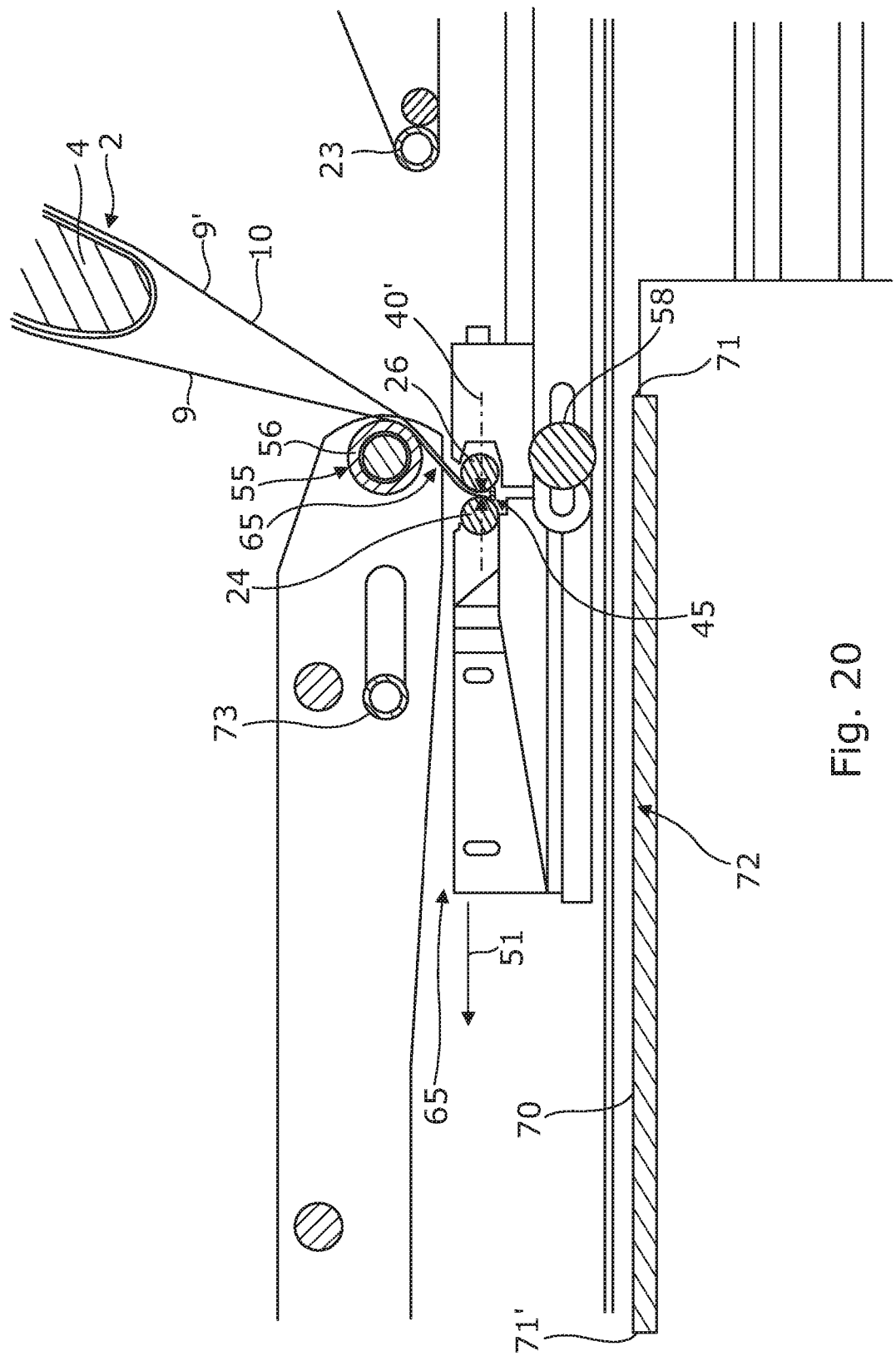
FIG. 20 follows from FIG. 19, and shows how the beaded cuff end becomes lodged or jammed beneath the gap, and how the cuff is pulled around an abutment as the gripping members move substantially horizontally in a void beneath the abutment.

As shown in FIGS. 9 and 20, the first and second actuators 31, 32 continue to move the first and second gripping members 24, 26 horizontally 51 together with the beaded cuff end 3 caught by the narrowed gap 40' thereby pulling the cuff end portion 10 downwards until the glove is fully stripped from the former 4. The glove 2 may initially stretch before being pulled free of the former, and the reaction force against this stretching beneficially helps to seat the beaded cuff end securely in position against a lower side 45 of the restricted gap 40', as shown in FIG. 20.

Figure 21:
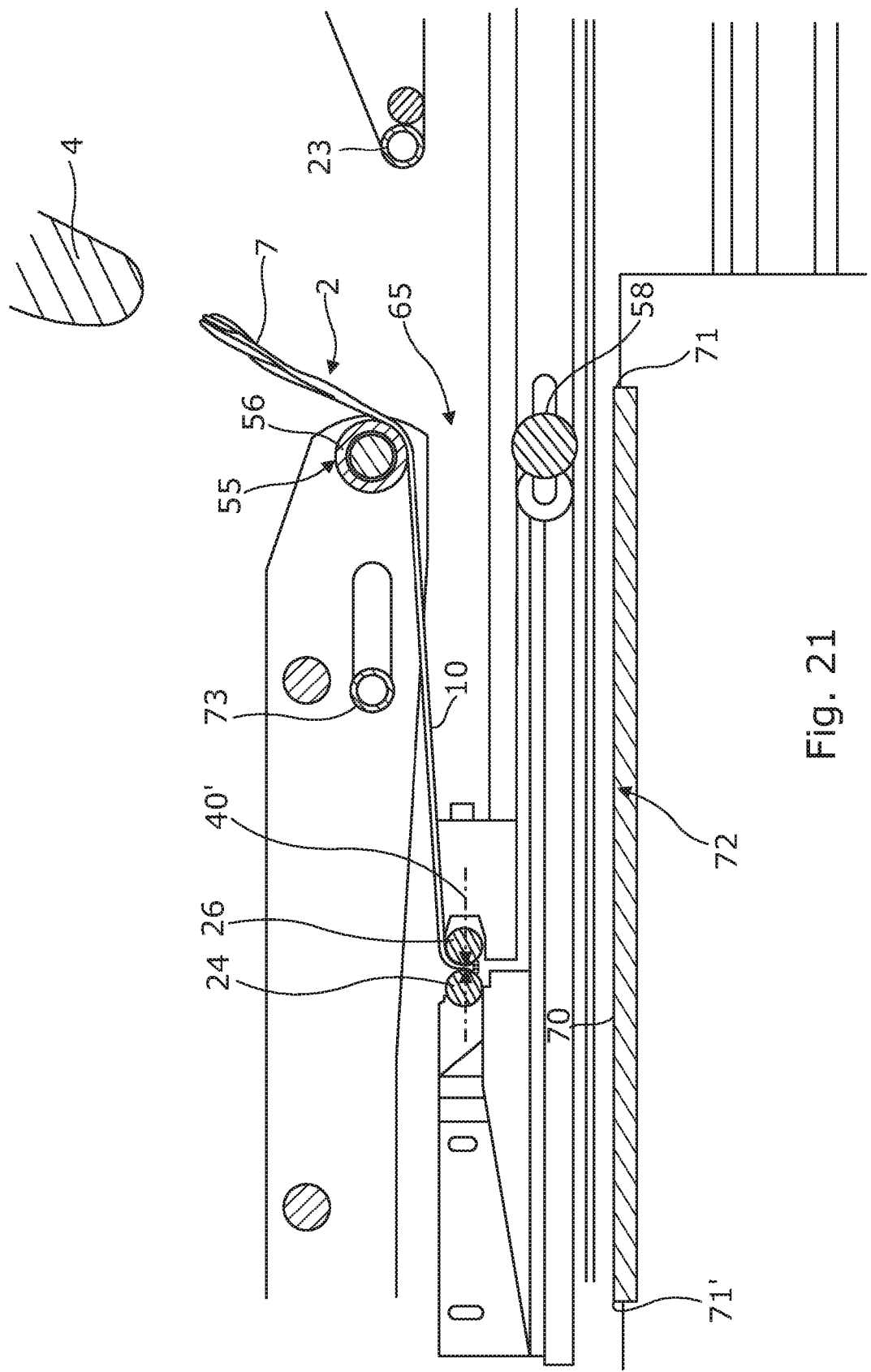
FIG. 21 follows from FIG. 20 and shows how continued movement of the first and second gripping members causes the cuff end to be pulled free from the former, the abutment turning the movement of the glove portion pulled from the former from a substantially vertical direction to a substantially horizontal direction.
Figure 22:
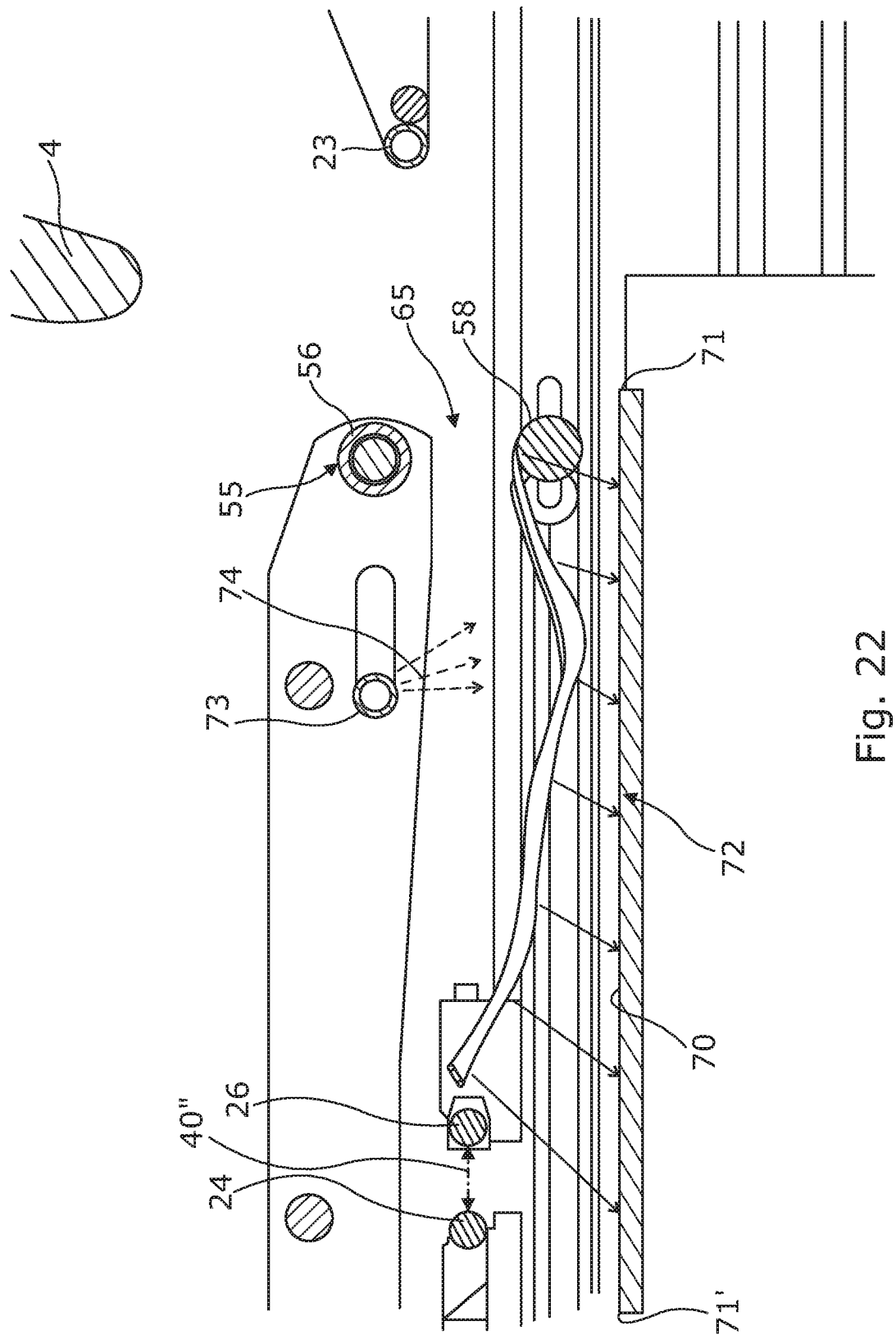
FIG. 22 follows from FIG. 21 and shows how the first and second gripping members then open to release the cuff end, following which the stripped glove falls in a substantially horizontal orientation onto a conveying surface of the conveyor belt.

Because the first and second gripping members 24, 26 move horizontally it is beneficial to re-direct forces in the cuff end portion 10 from substantially horizontal to substantially vertical, so that the glove is peeled smoothly off the former 4. As shown in FIGS. 20 and 21, this is accomplished by an elongate, longitudinally extending abutment 55, which is horizontal in the longitudinal or x-direction, and which is positioned above the level of the gap 40. An open space 65 is provided beneath the abutment so that the first and second gripping members 24, 26 are free to move horizontally. To reduce friction, the abutment is a free roller, having an outer rolling sleeve 56

The first and second actuators 31, 32 then continue to move the gripping device 25 horizontally and also longitudinally in order to track the longitudinal motion of the formers 4, until the glove is fully stripped. The motion causes the glove, which is held only at the cuff end portion 10 where this meets the beaded cuff end 3, to fall in a substantially horizontal orientation onto a glove deposition surface 70, provided by a belt conveyor 72

As the glove approaches the deposition surface 70 the first and second gripping actuators 31, 32 move the first and second gripping members 24, 26 apart to open the gap 40". Air resistance, and frictional drag as the glove digit portion 7 begins to touch a lower longitudinally extending abutment 58, provided proximate an outer edge 71 of the deposition surface, cause the glove cuff end 10 to fall out from between the opposed gripping surfaces 34, 36, whereupon the glove 2 falls freely and is deposited substantially flat in a transverse orientation on the deposition surface 70. The lower abutment 58 has been found to be useful in dampening down movement of finger portions 7 so that the fingers 17, including the thumbs 19, do not fold over themselves.

During this process, a second air bar 73 sends out a blast of air 74 directed substantially downwardly at the finger portions, which helps to flatten these onto the conveying surface, following which, the cuff beaded end 3 is pulled free from between the open gripping surfaces 34, 36 so that the glove comes completely away from the gripping members 24, 26. Preferably, the air blast is powerful enough to secure or "pin" a portion or region of the glove firmly to the deposition surface 70 so that subsequent horizontal movement of the grippers away from the pinned region causes the glove cuff end to be pulled out fully from between the grippers, and then drop onto the deposition surface. The air blast (brake) pins the glove to the conveyor, stops it and pulls it out of the moving jaws of the gripper and is more effective the lower the jaws are to the conveyor. Although not illustrated, it will be appreciated that the gloves may, alternatively, be flattened and secured or pinned to the deposition surface by mechanical means, for example a cam, air driven or electrically operated mechanical device moving in the vertical (z) direction.

In some embodiments it is beneficial for the second air bar 73 to send out or emit a prolonged jet or stream of air directed substantially downwardly at the glove 2' lying on the deposition surface 70. This stream of air maintains the glove 2' in a flattened configuration, lying against the deposition surface 70, whilst the gripping members 24, 26 advance towards the next glove(s) 2 to be peeled from the former(s) 4. This has the advantage that the gripping members 24, 26 may be positioned closer to the deposition surface 70 without hitting or disturbing the glove(s) 2' on the deposition surface 70 during movement of the gripping members 24, 26, as the glove 2' and in particular the beaded end 3 of the cuff are flattened against the deposition surface 70.

The closer the gripping members 24, 26 are to the deposition surface 70 the easier it is for the combination of the friction forces between the glove 2 and the lower longitudinally extending abutment 58, the friction forces between the glove 2 and the deposition surface 70, and the blast of air 74 from the second air bar 73 to stop or arrest movement of the glove 2 in exactly the required transverse position on the deposition surface 70 and the conveyor 72, i.e. each of the gloves 2' removed from the formers 4 is positioned at a relatively consistent distance from the outer edge 71 of the deposition surface 70.

As will be appreciated from the above description, the arrangement is such that the glove is stripped substantially downwardly from the former 4 and is turned substantially horizontal by the abutment as the glove cuff end portion 10 is pulled by the first and second gripping members in the first direction 51.

Optionally, as shown in the drawings, the third actuator 33 may also move the gripping device 25 with a longitudinal component of motion to match the forwards speed 99 of the formers 4.

Figure 12:
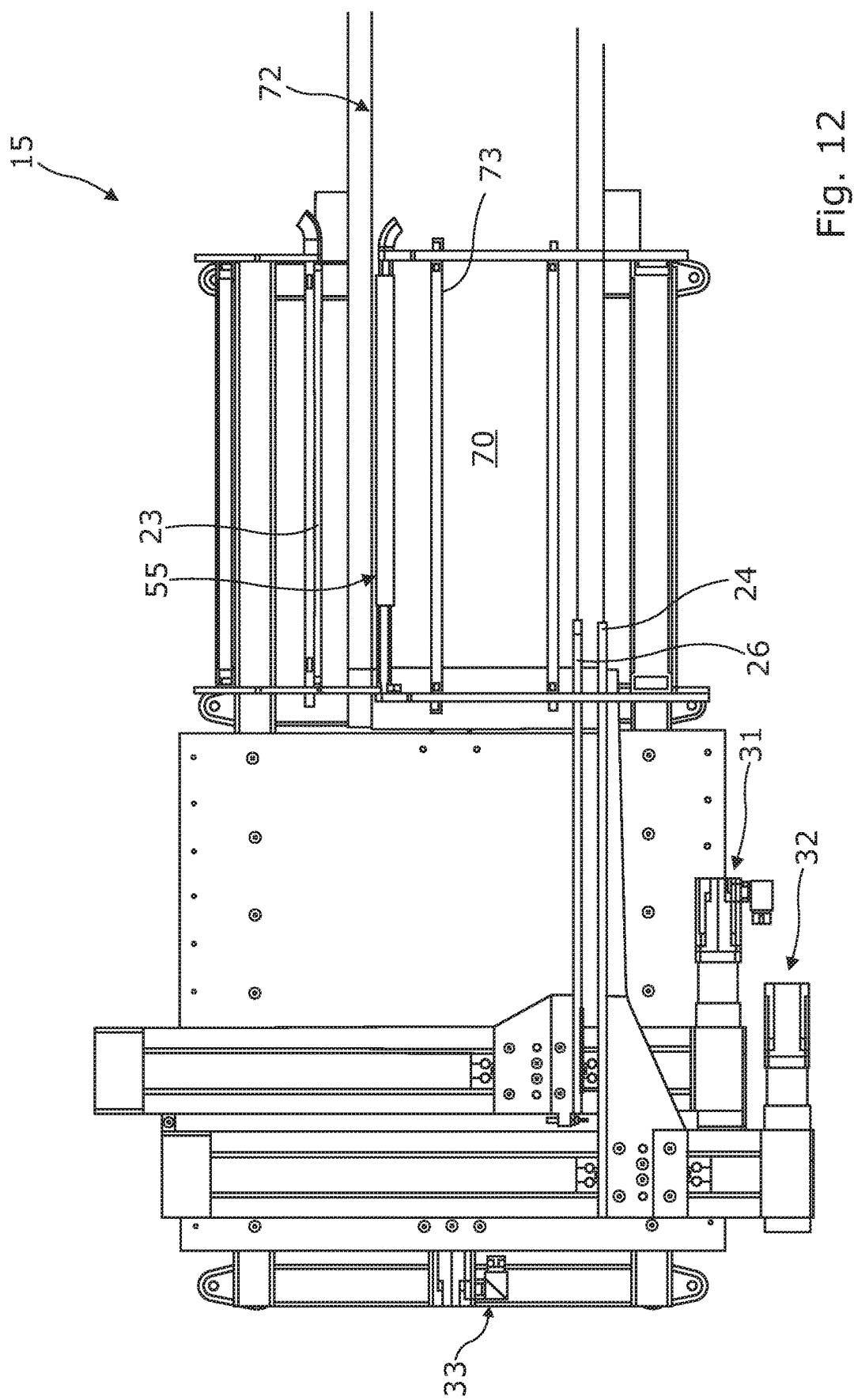
FIG. 12 follows from FIG. 11, showing how the first and second gripping members are moved relatively apart into an open configuration as both are moved transversely in a second direction, opposite to the first direction, and with an open longitudinal end of the pair of grippers facing in the x-direction towards on-coming subsequent gloves to be stripped.
Figure 13:
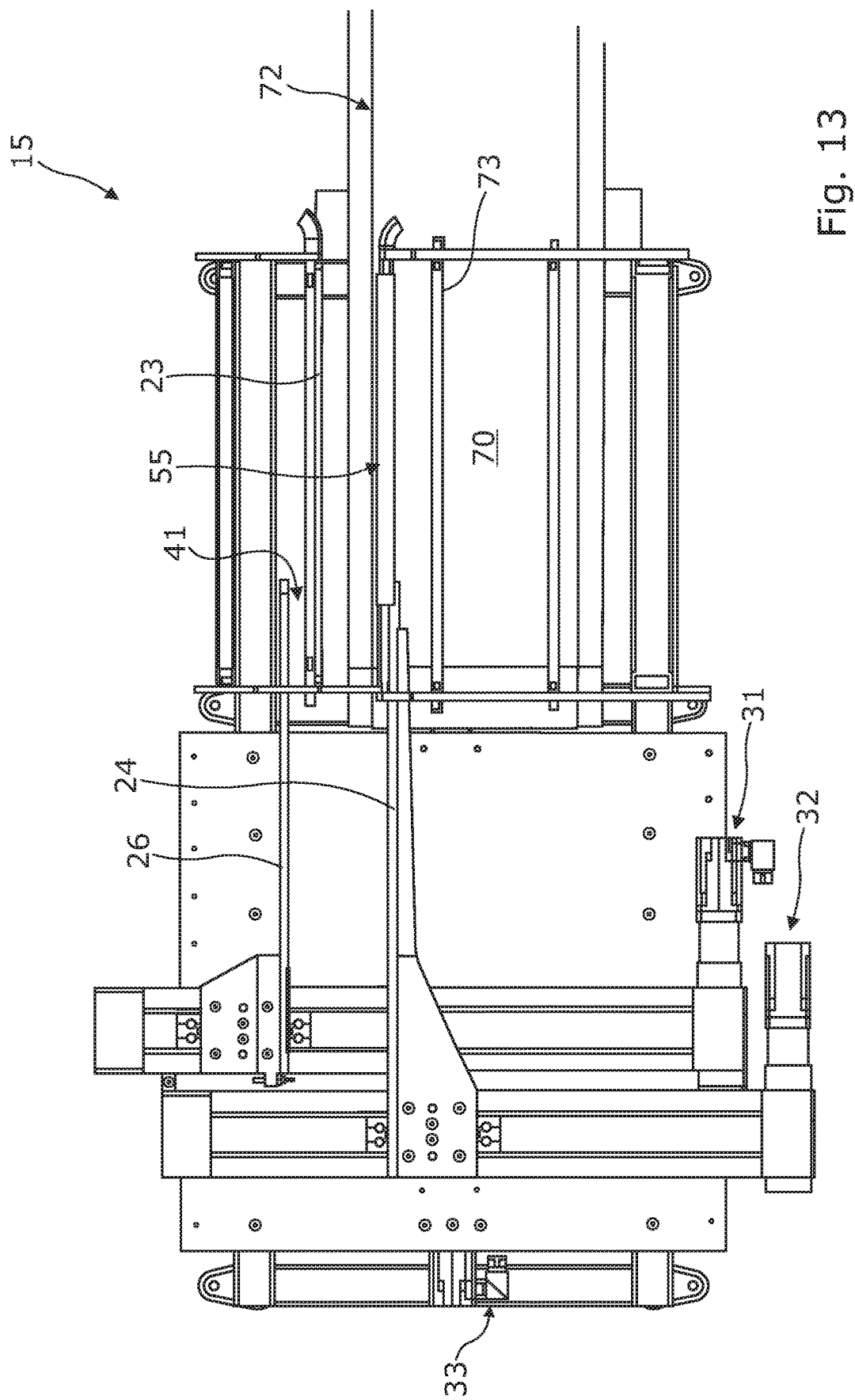
FIGS. 13 to 15 follows sequentially from FIG. 12, showing how the first and second gripping members in the open configuration are then moved in the opposite direction to the movement of the formers, so that the gripping members may receive therebetween the next two cuff end portions.
Figure 14:
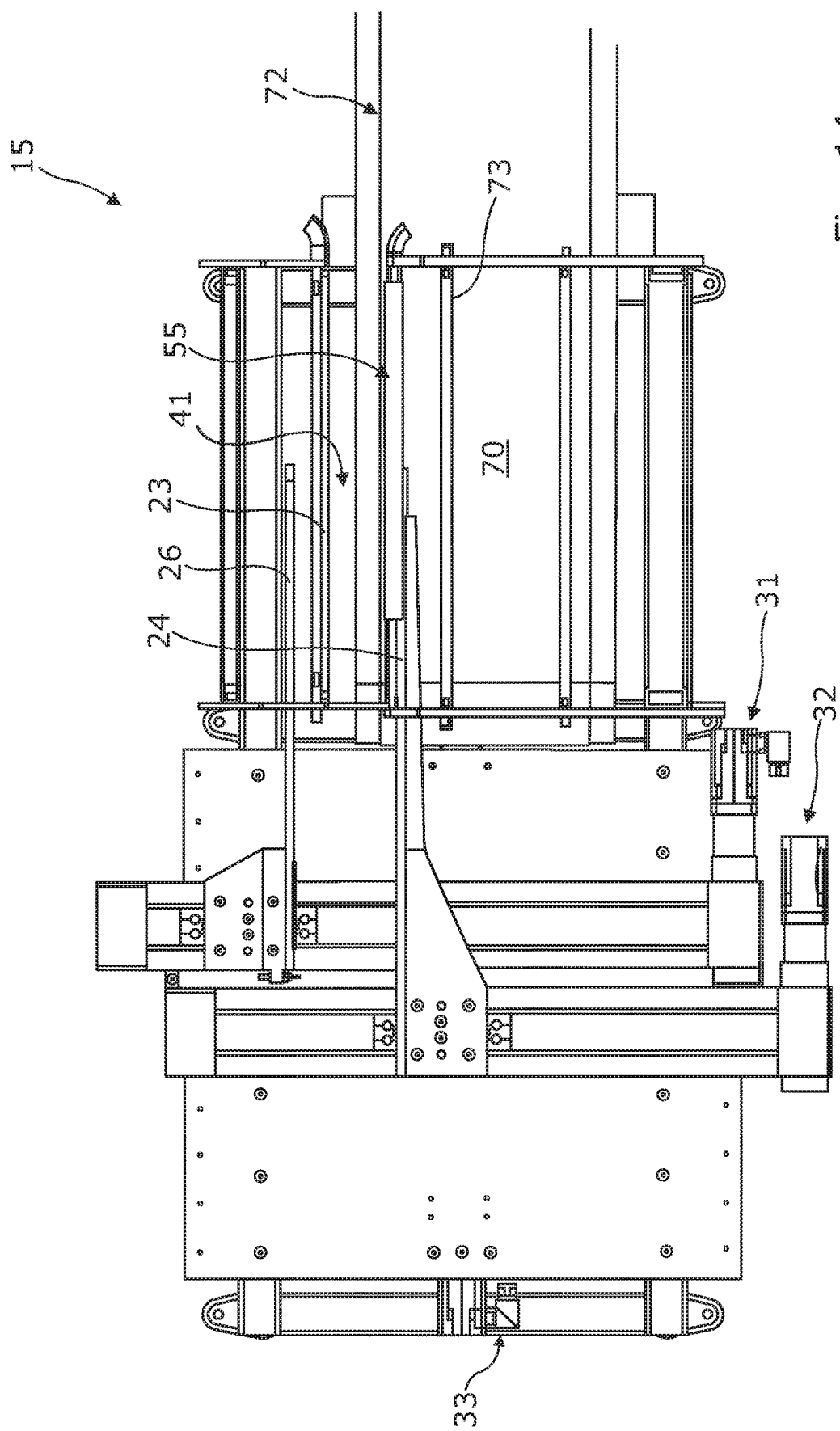
Figure 15:
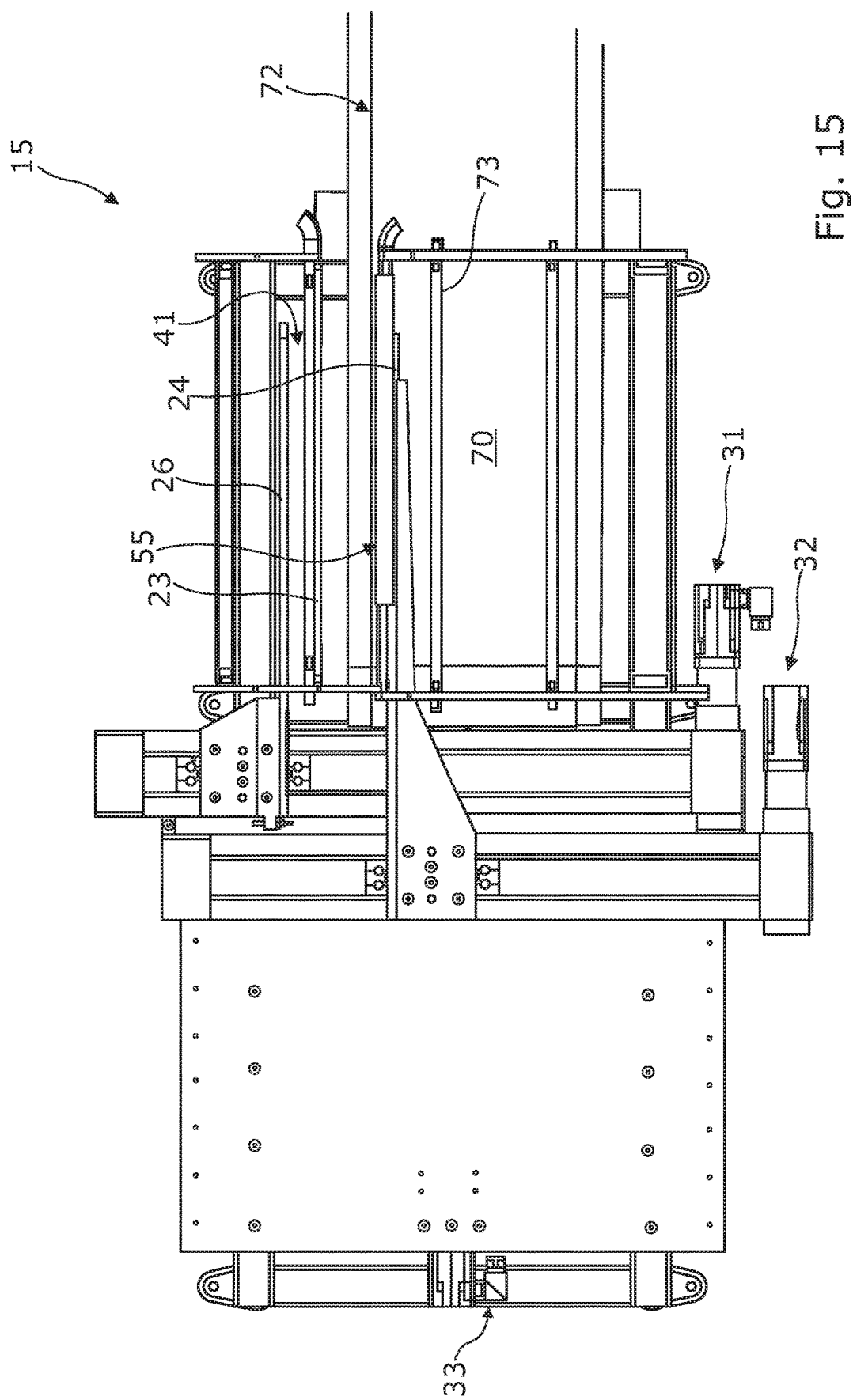

Following stripping, the cyclic movement of the gripping device 25 is completed, for example as shown in FIGS. 12 to 14, in which the gripping members are fully withdrawn in the longitudinal direction, however, it is not necessary to withdraw the gripping members any further in the longitudinal direction if the technique illustrated in FIGS. 16 to 18 is used to catch the cuff end portion 10 between the opposed gripping surfaces 34, 36.

The actuators 31, 32, 33 described above operate under the control of a controller 50 and together form a synchronised set of actuators configured to perform, in sequence, the process steps described above.

Once on the conveyor surface 70, as shown in FIGS. 3 and 4, a series of deposited gloves 2' then feeds an automatic glove packing station, for example of the type described in patent document WO 2011/048414 A1.

In the embodiment described above, the conveyor surface 70 on which gloves 2' are deposited moves in the opposite direction as the dip-moulding formers 4. The advantage of this arrangement is that the total travel taken by the carriages 27, 28 in the longitudinal direction (i.e. the direction of motion of the formers) is reduced.

A particular benefit of the invention is that deposited gloves on the receiving surface 70 are kept flatter. The gloves 2 are dropped in a substantially horizontal orientation in close proximity with the receiving surface, so that the gloves do not have time to bend or fold in an unwanted way prior to coming to rest on the receiving surface, or on a previously deposited glove, if a stack is being formed.

Another significant benefit of the invention is that the automatic registration of the cuff beaded end 3 with the opposed gripping surfaces 34, 36 helps to ensure that the cuff end is then deposited in a known and predicable manner, for example with a separation from an edge 71, 71' of the receiving surface 70, that is highly consistent and repeatable from glove to glove, as shown in FIG. 3.

These factors help to make further processing of the gloves more consistent and help to optimise the way gloves lie one on another when formed into a stack. This in turn helps to increase the number of gloves that can be packed into a glove dispenser of a given volume.

Although the invention has been described with particular reference to the production of disposable hygienic inspection gloves, the principles of the invention can be applied a wide range of different types of flexible gloves, for example cleaning gloves.

The invention described above, in its various embodiments, therefore provides a convenient apparatus and method for stripping and subsequent handling of a variety of types of flexible glove produced in a dip-moulding process when such gloves are to be stripped off a former 4 and then moved for further processing, for example being deposited on a conveyor 72, in a stack or in a box.

It is to be recognized that various alterations, modifications, and/or additions may be introduced into the methods, and the constructions and arrangements of parts described above without departing from the spirit or scope of the present invention, as defined by the appended claims.

It is to be recognized that various alterations, modifications, and/or additions may be introduced into the methods, and the constructions and arrangements of parts described above without departing from the spirit or scope of the present invention, as defined by the appended claims.

The invention claimed is:

1. A glove stripping apparatus for fully stripping from a series of dip moulding formers a corresponding series of partially stripped elastomeric dip-moulded gloves each having a downwardly hanging cuff end portion of said glove, each of said cuff end portions having opposite first and second sides and being terminated at a beaded cuff end, the apparatus comprising:

a gripper having a first gripping member and a second gripping member, the first gripping member being moveable relative to the second gripping member and/or the second gripping member being moveable relative to the first gripping member for gripping said opposite first and second sides of at least one of said cuff end portions each downwardly hanging from a corresponding dip moulding former in the series of dip moulding formers, said gripper being movable away from said dip moulding former during stripping of a glove from said former;

an abutment, said abutment being located proximate said first side of said downwardly hanging cuff end portion;

an open space beneath said abutment, said open space extending in a first direction away from said first side, the gripper being horizontally movable in said open space in said first direction during said stripping; and an actuation system, said system comprising at least one actuator for driving movement of at least one of said first and second gripping members during gripping of said cuff end portion and for driving movement of said gripper during said stripping, and a controller for controlling said movements during gripping and stripping of said glove;

wherein the actuation system is configured to use the gripping members to grip said cuff end portion and then to move the gripper in said open space substantially horizontally in said first direction during said stripping thereby pulling said first side against said abutment so that a first stripped portion of said glove extends generally sideways between the gripping members and said abutment, and a second stripped portion of said glove extends generally upwards between the abutment and said former, until said glove is fully stripped by said substantially horizontal movement of said gripper.

2. A glove stripping apparatus as claimed in claim 1, in which the abutment presents a bearing surface to said first side, said bearing surface being adapted not to bind with movement of the first and second stripped portions during stripping of the glove.

3. A glove stripping apparatus as claimed in claim 2, in which the bearing surface is convex between the first and second stripped portions.

4. A glove stripping apparatus as claimed in claim 1, in which the abutment presents a bearing surface to said first side, said bearing surface being a smooth non-rotating surface or a roller bearing surface or an air bearing surface.

5. A glove stripping apparatus as claimed in claim 1, in which the abutment does not move during stripping of said glove.

6. A glove stripping apparatus as claimed in claim 1, in which the abutment is elongate and substantially parallel with said first side of said cuff end portion.

7. A glove stripping apparatus as claimed in claim 1, in which at least one of said first and second members is moveable relative to the other one of said members for releasing said opposite first and second sides after said glove has been fully stripped, and the actuation system comprises at least one actuator for driving movement of at least one of said first and second gripping members during release of said cuff end portion, wherein the actuation system is configured to use the gripping members to release said cuff end portion after the glove has been fully stripped.

8. A glove stripping apparatus as claimed in claim 7, further comprising a glove deposition surface for receiving said released stripped gloves, said open space in which the first and second gripping members move substantially horizontally extending between the glove deposition surface and said abutment.

9. A glove stripping apparatus as claimed in claim 1, in which:

the first gripping member has a first gripping surface extending in a substantially horizontal direction for gripping the first side of at least one of said cuff end portions;

the second gripping member has a second gripping surface extending in a substantially horizontal direction for gripping the second side of at least one of said cuff end portions during stripping of said gloves, said gripping members being oriented with respect to each other such that the first and second gripping surfaces face each other across a gap;

at least one of said first and second gripping surfaces is convex, whereby a void is provided beneath said gap so that, in use, the beaded cuff end and adjacent cuff end portion are able to hang downwardly from said gap into said void; and the gripping members grip said cuff end portion by relative movement of the first and second gripping members towards one another to narrow the distance across said gap, whereby the first and second gripping members are movable between: (i) an open configuration for receiving in said gap said cuff end portion whereby said cuff end portion extends above and below said gap with said beaded cuff end located in the void beneath said gap; and (ii) a closed configuration in which said gap is narrowed sufficiently to block passage through said narrowed gap of said beaded cuff end but is not narrowed enough to hinder movement of the cuff end portion, so that during said stripping the cuff end portion is able to move in said gap until the beaded cuff end is caught by said narrowed gap.

10. A glove stripping apparatus as claimed in claim 1, in which the second gripping member, and optionally also the first gripping member, is a rod.

11. A glove stripping apparatus as claimed in claim 1, in which:

at least one of said gripping members is moveable relatively apart with respect to the other one of said members for receiving said downwardly hanging cuff end, said gripper being movable towards a line of said formers in a third direction substantially opposite to the first direction during receiving of said cuff end portion;

said at least one actuator of the actuation system is configured to drive said movements apart and in the third direction prior to receiving of said cuff end portion between the first and second gripping members, and the controller is arranged to control said movement apart and in the third direction during receiving of said cuff end portion.

12. A glove stripping apparatus as claimed in claim 11, in which said movement in the third direction is in a substantially horizontal direction during which the second gripping member is moved into contact with the first side of said downwardly hanging cuff end portion until the beaded cuff end rides over the second gripping member and into said gap between the first and second gripping members.

13. A production line for producing a plurality of elastomeric dip-moulded gloves, the production line comprising:

a plurality of dip moulding formers;

a dip-moulding stage for coating and curing on said formers said gloves;

a partial glove stripping apparatus configured to partially strip said cured gloves from said formers such that a cuff end portion of said gloves hangs downwardly from said dip-moulding formers with a beaded cuff end of said gloves being lowermost, said cuff end portion having a first material thickness and said beaded cuff end having a second material thickness, said first thickness being less than said second thickness; and a glove stripping apparatus configured to fully strip said partially stripped gloves from said formers; wherein the glove stripping apparatus is according to claim 1.

14. A production line for producing a plurality of elastomeric dip-moulded gloves, the production line comprising:

a plurality of dip moulding formers;

a dip-moulding stage for coating and curing on said formers said gloves;

a partial glove stripping apparatus configured to partially strip said cured gloves from said formers such that a cuff end portion of each of said gloves hangs downwardly from said dip-moulding formers with a beaded cuff end of each of said gloves being lowermost, said cuff end portion having a first material thickness and said beaded cuff end having a second material thickness, said first thickness being less than said second thickness; and a glove stripping apparatus configured to fully strip said partially stripped gloves from said formers; wherein the glove stripping apparatus comprises an abutment and an actuator system for gripping and stripping partially stripped gloves from the formers and a gripping device with opposed first and second gripping members, said abutment being located proximate a first side of said downwardly hanging cuff end portion and said gripping members providing opposed gripping surfaces on opposite sides of a gap where said gripping members are closest to one another, said gap having a width and the actuator system being configured to move said gripping members with respect to each other to vary the width of said gap;

and wherein the actuator system is configured to:

relatively move apart said gripping surfaces to increase the width of said gap and to position said gripping surfaces on opposite sides of the downwardly hanging cuff end portion of at least one glove and with the beaded cuff end of said at least one glove hanging in a void below said gripping surfaces;

relatively move together said gripping surfaces to restrain the downwardly hanging cuff end portion of said at least one glove between said gripping surfaces; and with said cuff end portion of said at least one glove restrained between said gripping surfaces, move said gripping surfaces substantially horizontally away from the former from which said cuff end portion hangs downwardly in a first direction towards and beneath said abutment in order to fully strip said gloves from said former.

15. A production line as claimed in claim 14, in which the actuator system is configured to:

relatively move together said gripping surfaces to restrain said cuff end portion between said gripping surfaces such that said gap is sufficiently narrow to block passage of the beaded cuff end through said gap while being sufficiently wide to allow passage of said cuff end portion;

move said gripping surfaces away from the former and in order to catch said beaded cuff end between said surfaces as the cuff end portion moves through said gap; and with said beaded cuff end caught by said gap, move said gripping surfaces substantially horizontally away from the former and in a first direction towards and beneath said abutment in order to fully strip said gloves from said former.

16. A production line as claimed in claim 14, further comprising a conveying surface for conveying stripped gloves away from the glove stripping apparatus, wherein the glove stripping apparatus is configured to repeatedly strip gloves from said formers and to deposit said stripped gloves on said conveying surface.

17. A method for fully stripping gloves from dip-moulding formers using a glove stripping apparatus when said gloves have already been partially stripped, each of said partially stripped gloves having a cuff end portion terminated with a beaded cuff end hanging downwardly from a corresponding one of said formers, the beaded cuff end being of thicker material than that of the cuff end portion, and the apparatus comprising an abutment proximate a first side of said downwardly hanging cuff end portion and a gripping device relatively movable with respect to said downwardly hanging cuff end portion, an open space extending beneath said abutment, said open space extending in a first direction away from said first side, and the gripping device comprising at least two gripping members including a first gripping member and a second gripping member, said gripping members having respective opposed first and second gripping surfaces and being movable relative to each other, the method comprising the steps of:

positioning the first gripping member and the second gripping member to provide a gap between said opposed gripping surfaces where said gripping surfaces are closest to each other;

receiving in said gap between said opposed gripping surfaces the cuff end portion of at least one of said partially stripped gloves hanging downwardly from at least one of said corresponding formers;

moving at least one of the first gripping member and the second gripping member relative to said cuff end portion to narrow said gap until said cuff end portion is restrained between said opposed gripping surfaces with said beaded cuff end being below said narrowed gap;

moving the first gripping member and the second gripping member in said open space substantially horizontally in said first direction during said stripping thereby pulling said first side against said abutment so that a first stripped portion of said glove is pulled generally sideways between the gripping members and said abutment, and a second stripped portion of said glove is pulled generally downwards between said former and the abutment, until said glove is fully stripped by said substantially horizontal movement of the first gripping member and the second gripping member.

18. A method as claimed in claim 17, in which the width of said narrowed gap between said opposed gripping surfaces is such that the cuff end portion but not the beaded cuff end is free to move within said gap so that said restrained cuff end portion moves towards said narrowed gap as the first stripped portion of said glove is pulled generally sideways until the beaded cuff end is lodged in said gap.

19. A method as claimed in claim 17, in which the method comprises after the glove has been fully stripped the step of moving apart the first gripping member and the second gripping member to release the stripped glove in a substantially horizontal orientation onto a glove deposition surface.

20. A method as claimed in claim 17, in which generally downward movement of the glove during stripping from said former is translated into generally horizontal movement by the abutment.

21. A method as claimed in claim 17, in which prior to receiving in said gap between said opposed gripping surfaces said downwardly hanging cuff end portion, the method comprises:

with both said first and second gripping members on the first side of a subsequent glove to be stripped, positioning the first gripping member and the second gripping member to provide a gap between said opposed gripping surfaces that is sufficiently wide to receive said downwardly hanging cuff end portion of said subsequent glove;

and then moving at least the second gripping member in a substantially horizontal direction towards the first side of said downwardly hanging cuff end portion of said subsequent glove until the second gripping member is moved into contact with said first side until the beaded cuff end rides over the second gripping member and into said gap between the first and second gripping members.

22. A method as claimed in claim 17, in which following full stripping of said glove, the method comprises moving said stripped gloves for further processing, by being deposited on a conveyor, in a stack or in a box.

23. A production line process for producing plurality of elastomeric dip-moulded gloves, each glove having a digit portion and a cuff end portion, said cuff end portion terminating at a beaded cuff end, the production line comprising a plurality of dip moulding formers on a conveying apparatus, a dip-moulding stage, a partial glove stripping stage and a full glove stripping stage, the process comprising the conveying apparatus moving the dip-moulding formers sequentially through:

the dip-moulding stage in which a resin is coated and cured on said formers to form said gloves;

the partial glove stripping stage in which said beaded cuff end is formed at a terminal end of the cuff end portion following which the cuff end portion of each of said gloves is stripped from said formers to hang downwardly from said formers with the beaded cuff end of each of said gloves being lowermost, said cuff end portion having a first material thickness and said beaded cuff end having a second material thickness, said first thickness being less than said second thickness; and the full glove stripping stage, in which partially stripped gloves are fully stripped from said formers by:

positioning a first gripping member and a second gripping member in opposition to one another to provide a gap between said first and second gripping members, said gap extending where a first gripping surface of the first gripping member is closest to a second gripping surface of the second gripping member;

receiving in said gap between said first and second gripping surfaces the downwardly hanging cuff end portion of at least one glove;

moving at least one of the first gripping member and the second gripping member relative to said cuff end portion to narrow the extent of said gap until said cuff end portion is restrained between said opposed gripping surfaces with said beaded cuff end being below said narrowed gap, said cuff end portion having opposite first and second sides, the first side oriented towards one of said gripping members and the second side oriented towards the other of said gripping members; and with said cuff end portion restrained between said opposed gripping surfaces, moving the first gripping member and the second gripping member in a direction towards an abutment, said abutment being below the former from which said cuff end portion hangs and initially being proximate said first side of said downwardly hanging cuff end portion, until said first side of said cuff end portion above said gap comes into contact with said abutment thereby pulling said first side of said cuff end portion against said abutment so that a first stripped portion of said glove is pulled generally sideways between the first and second gripping members and said abutment, and a second stripped portion of said glove is pulled generally downwards between said former and the abutment, until said glove is fully stripped by said substantially horizontal movement of the first gripping member and the second gripping member.

24. A production line process as claimed in claim 23, in which the full glove stripping stage deposits stripped gloves on a conveyor surface, a series of said deposited gloves then feeding an automatic glove packing station.

\* \* \* \* \*